(12) United States Patent
Takeichi et al.

(10) Patent No.: US 11,022,430 B2
(45) Date of Patent: Jun. 1, 2021

(54) EYEGLASS FRAME SHAPE MEASUREMENT DEVICE AND STORAGE MEDIUM

(71) Applicant: NIDEK CO., LTD., Aichi (JP)

(72) Inventors: Kyoji Takeichi, Aichi (JP); Michihiro Takii, Aichi (JP); Takaaki Matsui, Aichi (JP)

(73) Assignee: NIDEK CO., LTD., Aichi (JP)

( * ) Notice: Subject to any disclaimer, the term of this patent is extended or adjusted under 35 U.S.C. 154(b) by 0 days.

(21) Appl. No.: 16/639,971

(22) PCT Filed: Aug. 28, 2018

(86) PCT No.: PCT/JP2018/031668
§ 371 (c)(1),
(2) Date: Feb. 18, 2020

(87) PCT Pub. No.: WO2019/049715
PCT Pub. Date: Mar. 14, 2019

(65) Prior Publication Data
US 2020/0191560 A1 Jun. 18, 2020

(30) Foreign Application Priority Data

Sep. 5, 2017 (JP) .............................. JP2017-169942

(51) Int. Cl.
*G01B 11/24* (2006.01)
(52) U.S. Cl.
CPC .................................... *G01B 11/24* (2013.01)
(58) Field of Classification Search
CPC .................................................... G01B 11/24
(Continued)

(56) References Cited

U.S. PATENT DOCUMENTS 6,122,063 A * 9/2000 Berndt ................... G01B 11/24
356/623
6,325,700 B1 12/2001 Mizuno et al.
(Continued)

FOREIGN PATENT DOCUMENTS

CN 1891983 A 1/2007
DE 9317381 U1 1/1994
(Continued)

OTHER PUBLICATIONS

International Search Report dated Dec. 4, 2018 issued by the International Searching Authority in counterpart International Application No. PCT/JP2018/031668 (PCT/ISA/210).
(Continued)

*Primary Examiner* — Roy M Punnoose
(74) *Attorney, Agent, or Firm* — Sughrue Mion, PLLC

(57) ABSTRACT

An eyeglass frame shape measurement device measures a shape of an eyeglass frame. The eyeglass frame shape measurement device includes a light projecting optical system that has a light source and emits a measurement light flux from the light source toward a groove of a rim of an eyeglass frame, a light receiving optical system that has a detector and causes the detector to receive a reflected light flux of the measurement light flux emitted toward the groove and reflected by the groove, an acquiring means section that acquires a cross-sectional shape of the groove based on the reflected light flux received by the detector, a change section that change a light receiving position of the reflected light flux, and a control section that control the change section to change the light receiving position of the reflected light flux so that the detector receives the reflected light flux.

13 Claims, 14 Drawing Sheets

(58) Field of Classification Search
USPC .......................................................... 356/612
See application file for complete search history.

(56) References Cited

U.S. PATENT DOCUMENTS

| | | | |
|---|---|---|---|
| 6,350,190 B1 | 2/2002 | Matsuyama | |
| 7,096,846 B1 | 8/2006 | Dondlinger et al. | |
| 9,080,853 B2 * | 7/2015 | Yamamoto | G01B 5/20 |
| 2002/0041357 A1 * | 4/2002 | Farcy | G01B 11/24 |
| | | | 351/42 |
| 2005/0275802 A1 | 12/2005 | Nauche et al. | |
| 2007/0017479 A1 | 1/2007 | Dondlinger et al. | |
| 2008/0017026 A1 | 1/2008 | Dondlinger et al. | |
| 2011/0131822 A1 * | 6/2011 | Matsuyama | G01B 5/20 |
| | | | 33/200 |
| 2014/0059871 A1 * | 3/2014 | Yamamoto | G01B 5/20 |
| | | | 33/200 |
| 2014/0373368 A1 * | 12/2014 | Shibata | B24B 9/146 |
| | | | 33/200 |
| 2020/0158496 A1 * | 5/2020 | Takii | B24B 9/14 |

FOREIGN PATENT DOCUMENTS

| | | |
|---|---|---|
| DE | 19831304 A1 | 1/2000 |
| JP | 3-264804 A | 11/1991 |
| JP | 2000-193429 A | 7/2000 |
| JP | 2000-314617 A | 11/2000 |
| JP | 2001-519025 A | 10/2001 |
| JP | 2002-181516 A | 6/2002 |
| JP | 2006-350264 A | 12/2006 |
| JP | 2010-237008 A | 10/2010 |
| JP | 2010-256151 A | 11/2010 |
| JP | 2014-85236 A | 5/2014 |
| JP | 2015-7536 A | 1/2015 |
| JP | 2015-068713 A | 4/2015 |
| JP | 2016-193468 A | 11/2016 |
| WO | 00/03839 A1 | 1/2000 |

OTHER PUBLICATIONS

Written Opinion dated Dec. 4, 2018 issued by the International Searching Authority in counterpart International Application No. PCT/JP2018/031668 (PCT/ISA/237).
Communication dated Apr. 6, 2021 issued by the European Patent Office in counterpart European Application No. 18853526.4.
Communication dated Mar. 29, 2021, issued by the State Intellectual Property Office of P.R. China in counterpart Chinese Application No. 201880053887.7.

* cited by examiner

EYEGLASS FRAME SHAPE MEASUREMENT DEVICE AND STORAGE MEDIUM

CROSS-REFERENCE TO RELATED APPLICATIONS

This application is a National Stage of International Application No. PCT/JP2018/031668 filed Aug. 28, 2018, claiming priority based on Japanese Patent Application No. 2017-169942, filed Sep. 5, 2017, the contents of all of which are incorporated herein by reference in their entirety.

TECHNICAL FIELD

The present disclosure relates to an eyeglass frame shape measurement device for obtaining a shape of an eyeglass frame, and a storage medium storing an eyeglass frame shape measurement program for controlling the eyeglass frame shape measurement device.

BACKGROUND ART

An eyeglass frame shape measurement device that traces a contour of a rim and measures a shape of the rim by inserting a probe into the rim of an eyeglass frame, pressing the probe against the rim, and moving the rim is known (for example, refer to Patent Literature 1). Based on the rim measurement result (trace data) obtained by the eyeglass frame shape measurement device, a shape (target shape) for fitting the eyeglass lens to the rim is obtained. In addition, the contour shape of the eyeglass lens is determined based on the shape, and the peripheral edge of the lens is processed by the eyeglass lens processing device.

CITATION LIST

Patent Literature

Patent Literature 1: JP-A-2015-007536

SUMMARY OF INVENTION

Incidentally, in order to excellently frame the processed lens into the eyeglass frame, it is considered that the shape of the rim and the contour shape of the processed lens are preferably close to each other. However, in the measurement of the rim shape using the probe, it is easy to perform measurement (for example, measurement of a part of the bottom of the rim) at the position where the probe is pressed, but it is difficult to obtain a cross-sectional shape of a groove of the rim.

Therefore, the inventors examined the eyeglass frame shape measurement device configured to emit the measurement light toward the groove of the rim of the eyeglass frame, receive the reflected light of the measurement light reflected by the groove of the rim of the eyeglass frame, and acquire the cross-sectional shape of the groove of the rim of the eyeglass frame based on the reflected light. However, in a case where such an eyeglass frame shape measurement device is used, depending on the shape of the eyeglass frame, it was found that there was a case where the reflected light flux of the groove of the rim was not excellently received at a predetermined position of the detector and it was difficult to acquire the cross-sectional shape of the groove of the rim.

In view of the above-described related art, an object of the technology of the present disclosure is to provide an eyeglass frame shape measurement device that can easily acquire a cross-sectional shape of a rim of various shapes of eyeglass frame, and a storage medium storing an eyeglass frame shape measurement program.

In order to solve the above-described problems, the present disclosure has the following configuration.

(1) According to a first aspect of the present disclosure, there is provided an eyeglass frame shape measurement device that measures a shape of an eyeglass frame, including: a light projecting optical system having a light source and emitting a measurement light flux from the light source toward a groove of a rim of the eyeglass frame; a light receiving optical system having a detector and causing the detector to receive a reflected light flux of the measurement light flux emitted toward the groove of the rim of the eyeglass frame by the light projecting optical system and reflected by the groove of the rim of the eyeglass frame; acquisition means for acquiring a cross-sectional shape of the groove of the rim of the eyeglass frame based on the reflected light flux received by the detector; change means for changing a light receiving position of the reflected light flux; and control means for controlling the change means to change the light receiving position of the reflected light flux such that the detector receives the reflected light flux of the groove of the rim.

(2) According to a first aspect of the present disclosure, there is provided a non-transitory computer readable recording medium storing an eyeglass frame shape measurement program executed in an eyeglass frame shape measurement device that measures a shape of an eyeglass frame, including a light projecting optical system having a light source and emitting a measurement light flux from the light source toward a groove of a rim of the eyeglass frame, a light receiving optical system having a detector and causing the detector to receive a reflected light flux of the measurement light flux emitted toward the groove of the rim of the eyeglass frame by the light projecting optical system and reflected by the groove of the rim of the eyeglass frame, acquisition means for acquiring a cross-sectional shape of the groove of the rim of the eyeglass frame based on the reflected light flux received by the detector, by executing the program by a processor of the eyeglass frame shape measurement device, the program causes the eyeglass frame shape measurement device to perform a control step of controlling change means for changing a light receiving position of the reflected light flux to change the light receiving position of the reflected light flux of the groove of the rim such that the detector receives the reflected light flux of the rim.

(2) According to a first aspect of the present disclosure, there is provided an eyeglass frame shape measurement program executed in an eyeglass frame shape measurement device that measures a shape of an eyeglass frame, including a light projecting optical system having a light source and emitting a measurement light flux from the light source toward a groove of a rim of the eyeglass frame, a light receiving optical system having a detector and causing the detector to receive a reflected light flux of the measurement light flux emitted toward the groove of the rim of the eyeglass frame by the light projecting optical system and reflected by the groove of the rim of the eyeglass frame, acquisition means for acquiring a cross-sectional shape of the groove of the rim of the eyeglass frame based on the reflected light flux received by the detector, by executing the program by a processor of the eyeglass frame shape measurement device, the program causes the eyeglass frame shape measurement device to perform a control step of controlling change means for changing a light receiving position of the reflected light flux to change the light receiving position of the reflected light flux of the groove of the rim such that the detector receives the reflected light flux of the rim.

DESCRIPTION OF EMBODIMENTS

Figure 1:
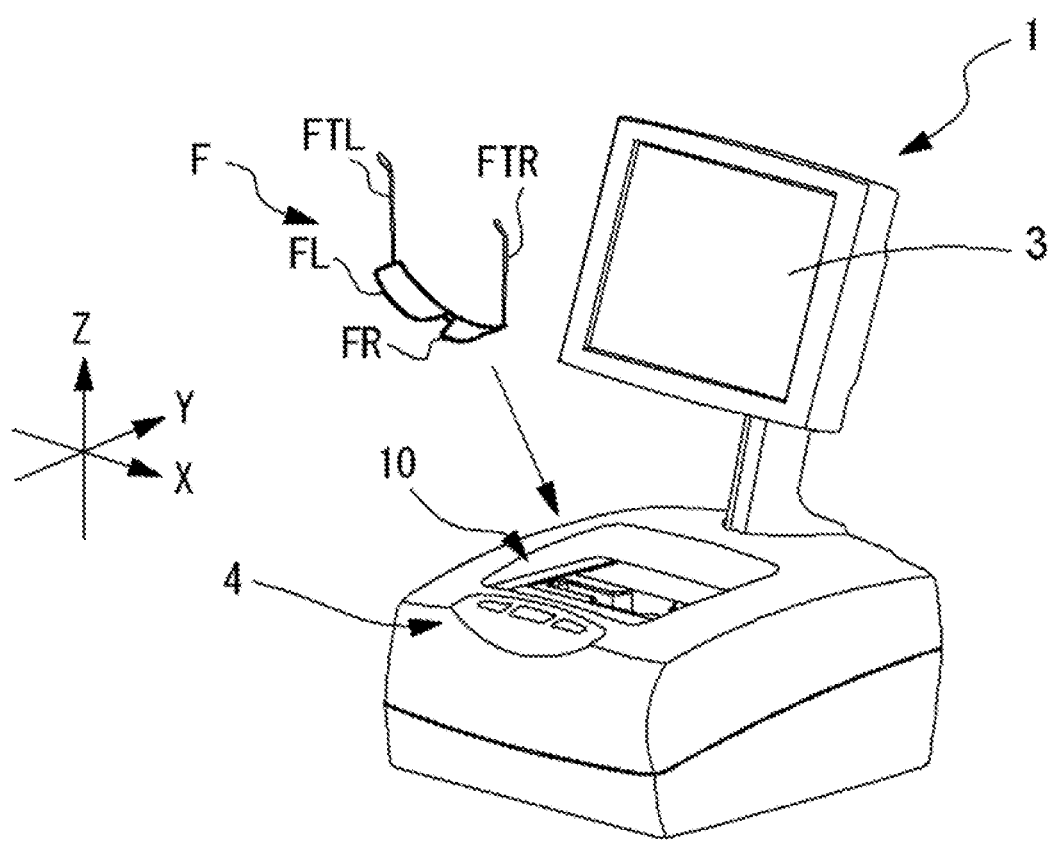
FIG. 1 is a schematic external view of an eyeglass frame shape measurement device.

Hereinafter, the present embodiment will be described below with reference to the drawings. FIGS. 1 to 14 are views for describing a configuration of an eyeglass frame shape measurement device according to the present embodiment. In the present embodiment, a depth direction (an up-down direction of an eyeglass frame when eyeglasses are disposed) of an eyeglass frame shape measurement device 1 is referred to as a Y direction, a horizontal direction (left-right direction) on a plane orthogonal (a left-right direction of the eyeglass frame when the eyeglasses are disposed) to the depth direction is referred as an X direction, and a perpendicular direction (a front-rear direction of the eyeglass frame when the eyeglasses are disposed) is referred to as a Z direction. In addition, the items classified by < > below can be used independently or in association with each other.

In addition, the present disclosure is not limited to the device described in the present embodiment. For example, terminal control software (program) for performing the functions of the following embodiments is supplied to a system or an apparatus via a network or various storage media. In addition, a control device (for example, a CPU or the like) of the system or the apparatus can read and execute the program.

In addition, in the eyeglass frame shape measurement device 1 according to the present embodiment, a rim part of an eyeglass frame F is disposed in a state of being downward and a temple part of the eyeglass frame F is disposed in a state of being upward. In other words, in a case where the eyeglass frame F is disposed in the eyeglass frame shape measurement device 1, left and right rims FL and FR of the eyeglass frame F are downward, and left and right temples FTL and FTR of the eyeglass frame F are upward. In the eyeglass frame shape measurement device 1 according to the present embodiment, a configuration in which the rim part of the eyeglass frame F is disposed in a state of being downward and the temple part of the eyeglass frame F is disposed in a state of being upward is described as an example, but it is needless to say that the present disclosure is not limited thereto. For example, a configuration in which the rim part of the eyeglass frame F is disposed in a state of being upward and the temple part of the eyeglass frame F is disposed in a state of being downward may be employed. In addition, for example, in a case where the eyeglass frame F is disposed in the eyeglass frame shape measurement device 1, a configuration in which upper ends of the left and right rims FL and FR of the eyeglass frame F are disposed to be downward, and lower ends of the left and right rims FL and FR of the eyeglass frame F are disposed to be upward may be employed. In addition, for example, in a case where the eyeglass frame F is disposed in the eyeglass frame shape measurement device 1, a configuration in which the upper ends of the left and right rims FL and FR of the eyeglass frame F are disposed to be upward, and the lower ends of the left and right rims FL and FR of the eyeglass frame F are disposed to be downward may be employed.

<Overview>

An overview of the eyeglass frame shape measurement device (for example, eyeglass frame shape measurement device 1) according to an embodiment of the present disclosure will be described. For example, the eyeglass frame shape measurement device according to the present embodiment measures the shape of the eyeglass frame. For example, the eyeglass frame shape measurement device includes a light projecting optical system (for example, light projecting optical system 30a). For example, the eyeglass frame shape measurement device includes a light receiving optical system (for example, light receiving optical system 30b). For example, the eyeglass frame shape measurement device includes acquisition means (for example, control portion 50).

For example, the light projecting optical system includes a light source (for example, light source 31). For example, the light projecting optical system emits the measurement light flux from the light source toward a groove of a rim of the eyeglass frame. For example, at least one light source may be used as the light source. For example, one light source may be used. In addition, for example, a plurality of light sources may be used.

For example, the light receiving optical system includes a detector (for example, detector 37). For example, the light receiving optical system causes the detector to receive a reflected light flux of the measurement light flux which is emitted toward the groove of the rim of the eyeglass frame by the light projecting optical system and reflected by the groove of the rim of the eyeglass frame. In addition, for example, at least one detector may be used as the detector.

For example, one detector may be used. For example, a plurality of detectors may be used.

For example, the acquisition means processes the reflected light flux of the measurement light flux reflected by the groove of the rim of the eyeglass frame, and acquires the cross-sectional shape of the groove of the rim of the eyeglass frame based on the reflected light flux of the measurement light flux received by the detector.

For example, in the present embodiment, the eyeglass frame shape measurement device includes: the light projecting optical system that emits the measurement light flux from the light source toward the rim of the eyeglass frame; the light receiving optical system that causes the detector to receive the reflected light flux of the measurement light flux emitted toward the rim of the eyeglass frame by the light projecting optical system and reflected by the rim of the eyeglass frame; and the acquisition means for acquiring the cross-sectional shape of the rim of the eyeglass frame by processing the reflected light flux. Accordingly, for example, the cross-sectional shape of the rim of the eyeglass frame can be acquired easily and accurately. In addition, for example, since measurement is performed using the measurement light flux, the measurement can be performed quickly.

For example, in the present embodiment, the eyeglass frame shape measurement device may include change means (for example, moving unit 210 and rotation unit 260) for changing a light receiving position of the reflected light flux. Further, for example, the eyeglass frame shape measurement device includes the control means (control portion 50) for controlling the change means to change the light receiving position of the reflected light flux such that the detector receives the reflected light flux of the groove of the rim. Accordingly, for example, since the reflected light flux is received by the detector, even in a case where various shapes of eyeglass frames have been measured, it is possible to excellently acquire the cross-sectional shape of the groove of the rim in various shapes of the eyeglass frame. In other words, the eyeglass frame shape measurement device according to the present disclosure can correspond to various shapes of eyeglass frames in acquiring the cross-sectional shape of the groove of the rim of the eyeglass frame.

<Light Projecting Optical System>

For example, the light projecting optical system may include an optical member. In this case, for example, the measurement light flux emitted from the light source may be emitted toward the groove of the rim of the eyeglass frame via each optical member. For example, as the optical member, at least one of a lens, a mirror, a diaphragm, and the like may be used. For example, the focal depth can increase by using a diaphragm. It is needless to say that the optical member is not limited to the above-described optical member, and different optical members may be used.

For example, the light projecting optical system may be configured such that the measurement light flux emitted from the light source is emitted toward the groove of the rim of the eyeglass frame. For example, a configuration having the light source at least may be employed. Further, for example, the light projecting optical system may be configured such that the measurement light flux emitted from the light source is emitted toward the groove of the rim of the eyeglass frame via a member different from the optical member.

For example, the measurement light flux emitted toward the groove of the rim of the eyeglass frame by the light projecting optical system may be emitted as spot-like measurement light flux. Further, for example, the measurement light flux emitted toward the groove of the rim of the eyeglass frame by the light projecting optical system may be measurement light flux (for example, slit-like measurement light flux) having a width. In this case, for example, the light projecting optical system may emit the measurement light flux from the light source toward the groove of the rim of the eyeglass frame and form a light cutting surface on the groove of the rim. For example, the light receiving optical system may receive the reflected light flux (for example, scattered light, regular reflected light, and the like) of the groove of the rim acquired by reflection (for example, scattering, regular reflection, and the like) at the groove of the rim of the light cutting surface, by the detector.

For example, in a case of emitting the measurement light flux having a width, a light source that emits a slit-like light flux may be used. For example, a point light source may be used. In this case, for example, a plurality of point light sources may be arranged side by side to emit the measurement light flux having a width. Further, for example, the measurement light flux having a width may be emitted by scanning a spot-like light flux emitted from the point light source. In addition, for example, the measurement light flux having a width may be emitted by diffusing a spot-like measurement light flux emitted from the point light source by the optical member. It is needless to say that, for example, as the light source, various types of light sources different from the above-described light source may be used to emit the measurement light flux having a width.

<Light Receiving Optical System>

For example, the light receiving optical system may include an optical member. In this case, for example, the reflected light flux of the measurement light flux reflected by the groove of the rim of the eyeglass frame may be received by the detector via each optical member. For example, as the optical member, at least one of a lens, a mirror, a diaphragm, and the like may be used. It is needless to say that the optical member is not limited to the above-described optical member, and different optical members may be used.

For example, the light receiving optical system may be configured such that the reflected light flux of the measurement light flux reflected by the groove of the rim of the eyeglass frame is received by the detector. For example, a configuration having the detector at least may be employed. Further, for example, the light receiving optical system may be configured such that the reflected light flux of the measurement light flux reflected by the groove of the rim of the eyeglass frame is received by the detector via a member different from the optical member.

<Acquisition Means>

For example, the acquisition means processes the reflected light flux of the measurement light flux reflected by the groove of the rim of the eyeglass frame, and acquires the cross-sectional shape of the groove of the rim of the eyeglass frame. For example, the acquisition means may acquire the cross-sectional shape from a light receiving position of the reflected light flux in the detector. For example, the cross-sectional shape may be an image (image data). In other words, the cross-sectional shape may be a cross-sectional image. In addition, for example, the cross-sectional shape may be a signal (signal data). In other words, the cross-sectional shape may be signal data of the cross-sectional shape.

For example, examples of the cross-sectional shape include a two-dimensional cross-sectional shape and a three-dimensional cross-sectional shape. For example, the two-dimensional cross-sectional shape is a cross-sectional shape acquired by irradiating the groove of the rim at one vector angle with the measurement light flux to receive the reflected light flux. For example, in the present embodiment, the two-dimensional cross-sectional shape is a shape of a surface obtained by cutting the groove of the rim in a direction (the Z direction in the present embodiment) orthogonal to a radius vector direction (the XY direction in the present embodiment) of the eyeglass frame. For example, the two-dimensional cross-sectional shape may be acquired by scanning the measurement light flux along a transverse position (the Z direction in the present embodiment). For example, the three-dimensional cross-sectional shape is a cross-sectional shape acquired by acquiring the two-dimensional cross-sectional shape for each vector angle. For example, the three-dimensional cross-sectional shape may be acquired by scanning the measurement light flux for acquiring the two-dimensional cross-sectional shape in a radius vector plane direction (the XY plane direction in the present embodiment) of the eyeglass frame.

In addition, for example, when the cross-sectional shape is acquired, in a case where a part of the cross-sectional shape is missing, the missing part may be interpolated from the light reception result of the reflected light flux at a position (for example, adjacent position) around the position where the part is missing. Further, for example, when the cross-sectional shape is acquired, in a case where a part of the cross-sectional shape is missing, the missing part may be interpolated by approximating the cross-sectional shape. For example, when the cross-sectional shape is acquired, in a case where a part of the cross-sectional shape is missing, the cross-sectional shape may be re-acquired such that the missing part is acquired.

For example, regarding the two-dimensional cross-sectional shape, the two-dimensional cross-sectional shape of the groove of the rim at least at one location (position of one vector angle) in the entire periphery (all parts where the rim is formed at each vector angle) of the rim of the eyeglass frame may be acquired. In this case, for example, the two-dimensional cross-sectional shape may be acquired in the entire periphery of the rim of the eyeglass frame. In this case, for example, the two-dimensional cross-sectional shape may be acquired at a plurality of positions (for example, the left end, the right end, the upper end, and the lower end of the eyeglass frame) in the entire periphery of the rim of the eyeglass frame. In addition, in this case, for example, the two-dimensional cross-sectional shape may be acquired at a position of one vector angle in the entire periphery of the rim of the eyeglass frame.

For example, in a case of acquiring the three-dimensional cross-sectional shape, the three-dimensional cross-sectional shape of the groove of the rim at least at a part of the region within the entire periphery (all parts where the rim is formed at each vector angle) of the rim of the eyeglass frame may be acquired. In this case, for example, the three-dimensional cross-sectional shape may be acquired in the entire periphery of the rim of the eyeglass frame. In this case, for example, the three-dimensional cross-sectional shape may be acquired at a plurality of regions (for example, the left end region, the right end region, the upper end region, and the lower end region of the eyeglass frame) in the entire periphery of the rim of the eyeglass frame. In addition, in this case, for example, the three-dimensional cross-sectional shape may be acquired at a part of the region in the entire periphery of the rim of the eyeglass frame. In addition, in a case where the three-dimensional cross-sectional shape is not acquired with respect to the entire periphery of the rim of the eyeglass frame, and in a case where the three-dimensional cross-sectional shape of the entire periphery of the rim of the eyeglass frame is to be acquired, the three-dimensional cross-sectional shape of the entire periphery of the rim of the eyeglass frame may be acquired by performing interpolation based on the two-dimensional cross-sectional shape (three-dimensional cross-sectional shape) of a part at which the two-dimensional cross-sectional shape is acquired.

<Change Means>

For example, the change means may include first change means (for example, the moving unit 210 and the rotation unit 260) for changing the irradiation position of the measurement light flux on the groove of the rim of the eyeglass frame. For example, the first change means is controlled by the control means. Accordingly, it becomes possible to irradiate any position of the groove of the rim in the eyeglass frame with the measurement light, and to acquire the cross-sectional shape of the groove of the rim at any position.

For example, the first change means may be configured to change a relative position between the irradiation position of the measurement light flux and the groove of the rim of the eyeglass frame. For example, the first change means may be configured to change at least one of the irradiation position of the measurement light flux and the position of the groove of the rim of the eyeglass frame. In this case, for example, the first change means may be configured to change the position of the groove of the rim of the eyeglass frame with respect to the irradiation position of the measurement light flux. In other words, the first change means may be configured to change the position of the eyeglass frame with respect to the irradiation position of the measurement light flux. In this case, for example, the first change means may be configured to change the irradiation position of the measurement light flux with respect to the position of the groove of the rim of the eyeglass frame. In this case, for example, the first change means may be configured to change both the position of the groove of the rim of the eyeglass frame and the irradiation position of the measurement light flux.

For example, as a configuration in which the first change means changes the relative position between the irradiation position of the measurement light flux and the groove of the rim of the eyeglass frame, a configuration for changing the relative position between the light projecting optical system and the groove of the rim of the eyeglass frame may be employed. For example, the position of the light projecting optical system may be a position of an optical axis (for example, optical axis L1) of the light projecting optical system. In other words, for example, the first change means may be configured to change the relative position between the irradiation position of the measurement light flux and the groove of the rim of the eyeglass frame by changing the relative position between the position of the optical axis of the light projecting optical system and the groove of the rim of the eyeglass frame.

For example, as a configuration for changing the relative position between the position (for example, the position of the optical axis of the light projecting optical system) of the light projecting optical system and the position of the groove of the rim of the eyeglass frame, a configuration for changing at least one of the position of the light projecting optical system and the position of the groove of the rim of the eyeglass frame may be employed. In this case, for example, as a configuration for changing at least one of the position of the light projecting optical system and the position of the groove of the rim of the eyeglass frame, a configuration for changing the position of the groove of the rim of the eyeglass frame with respect to the position of the light projecting optical system may be employed. In addition, in this case, for example, as a configuration for changing at least one of the position of the light projecting optical system and the position of the groove of the rim of the eyeglass frame, a configuration for changing the position of the light projecting optical system with respect to the position of the groove of the rim of the eyeglass frame may be employed. Further, in this case, for example, as a configuration for changing at least one of the position of the light projecting optical system and the position of the groove of the rim of the eyeglass frame, a configuration for changing both the position of the light projecting optical system and the position of the groove of the rim of the eyeglass frame may be employed.

For example, as a configuration for changing the position of the light projecting optical system, a configuration for changing the position of at least one member (for example, a light source, an optical member, or other members) included in the light projecting optical system may be employed. In other words, for example, the first change means may be configured to change the position of the light projecting optical system with respect to the groove of the rim of the eyeglass frame by changing a position of at least a part (a part of the members) of the light projecting optical system. In this case, for example, the control means may control the first change means to change the position of east the part the light projecting optical system to change the irradiation position of the measurement light flux with respect to the groove of the rim of the eyeglass frame.

For example, in the eyeglass frame shape measurement device, the first change means is first change means for moving at least the part of the light projecting optical system, and the control means controls the first change means to move at least the part of the light projecting optical system with respect to the groove of the rim of the eyeglass frame and change the irradiation position of the measurement light flux with respect to the groove of the rim of the eyeglass frame. Accordingly, it becomes possible to irradiate any position of the groove of the rim in the eyeglass frame with the measurement light flux, and to acquire the cross-sectional shape of the groove of the rim at any position.

For example, as a configuration for charging the position of at least the part of the light projecting optical system, X-direction driving means having a drive source (for example, a motor) and moving the position of at least the part of the light projecting optical system in the X direction may be employed. For example, as a configuration for changing the position of at least the part of the light projecting optical system, the Y-direction driving means having the drive source (for example, a motor) and moving the position of at least the part of the light projecting optical system in the Y direction may be employed. For example, as a configuration for changing the position of at least the part of the light projecting optical system, Z-direction driving means having a drive source (for example, a motor) and moving the position of at least the part of the light projecting optical system in the Z direction may be employed. For example, as a configuration for changing the position of at least the part of the light projecting optical system, rotation driving means (for example, rotation unit 260) having a drive source (for example, a motor) and rotating the position of at least the part of the light projecting optical system may be employed. Further, for example, as a configuration for changing the position of at least the part of the light projecting optical system, at least one of the X-direction driving means, the Y-direction driving means, the Z-direction driving means, and the rotation driving means may be employed. It is needless to say that a configuration for changing the position of at least the part of the light projecting optical system is not limited to the above-described driving means and a configuration in which driving means for changing the position of at least the part of the light projecting optical system in a direction different from the above-described direction may be employed.

Further, for example, as a configuration for changing the position of at least the part of the light projecting optical system, scanning means having an optical scanner and scanning the optical scanner may be employed. In this case, for example, the irradiation position of the measurement light flux may be changed by changing the angle of the optical scanner. In other words, for example, the irradiation position of the measurement light flux may be changed by changing the position of the optical scanner.

For example, as a configuration for changing the position of the groove of the rim of the eyeglass frame, the X-direction driving means having a drive source (for example, a motor) and moving the eyeglass frame in the X direction may be employed. In addition, for example, as a configuration for changing the position of the groove of the rim of the eyeglass frame, the Y-direction driving means having the drive source (for example, a motor) and moving the eyeglass frame in the Y direction may be employed. Further, for example, as a configuration for changing the position of the groove of the rim of the eyeglass frame, the Z-direction driving means having a drive source (for example, a motor) and moving the eyeglass frame in the Z direction may be employed. In addition, for example, as a configuration for changing the position of the groove of the rim of the eyeglass frame, the rotation driving means having a drive source (for example, a motor) and rotating the eyeglass frame may be employed. Further, for example, as a configuration for changing the position of the groove of the rim of the eyeglass frame, at least one of the X-direction driving means, the Y-direction driving means, the Z-direction driving means, and the rotation driving means may be employed. It is needless to say that a configuration for changing the position of the groove of the rim of the eyeglass frame is not limited to the above-described driving means and a configuration in which the driving means for changing the position of the groove of the rim of the eyeglass frame in a direction different from the above-described direction may be employed.

For example, the change means may include a second change means (for example, the moving unit 210 and the rotation unit 260) for changing the light receiving position of the reflected light flux by the light receiving optical system. For example, the second change means is controlled by the control means. Accordingly, for example, the light receiving position can be changed to a position where the cross-sectional shape of the groove of the rim can be acquired excellently, and the cross-sectional shape of the rim of the eyeglass frame can be acquired more accurately.

For example, the second change means may be configured to change the light receiving position of the reflected light flux by the light receiving optical system by changing the relative position between the position of the light receiving optical system and the groove of the rim of the eyeglass frame. For example, the position of the light receiving optical system may be a position of an optical axis (for example, optical axis L2) of the light receiving optical system. In other words, for example, the second change means may be configured to change the relative position between the irradiation position of the measurement light flux and the groove of the rim of the eyeglass frame by changing the relative position between the position of the optical axis of the light receiving optical system and the groove of the rim of the eyeglass frame.

For example, the second change means may be configured to change at least one of the position of the light receiving optical system and the position of the groove of the rim of the eyeglass frame. In this case, for example, the second change means may be configured to change the position of the groove of the rim of the eyeglass frame with respect to the position of the light receiving optical system. In other words, the second change means may be configured to change the position of the eyeglass frame with respect to the position of the light receiving optical system. In this case, for example, the second change means may be configured to change the position of the light receiving optical system with respect to the position of the groove of the rim of the eyeglass frame. In this case, for example, the second change means may be configured to change both the position of the groove of the rim of the eyeglass frame and the position of the light receiving optical system.

For example, as a configuration for changing the position of the light receiving optical system, a configuration for changing the position of at least one member (for example, a detector, an optical member, or other members) included in the light receiving optical system may be employed. In other words, for example, the second change means may be configured to change the position of the light receiving optical system with respect to the groove of the rim of the eyeglass frame by changing a position of at least a part (a part of the member) of the light receiving optical system. In this case, for example, the control means may control the second change means to change the position of at least the part of the light receiving optical system and change the light receiving position of the reflected light flux by the light receiving optical system.

For example, as a configuration for changing the position of at least the part of the light receiving optical system, the X-direction driving means having the drive source (for example, a motor) and moving the position of at least the part of the light receiving optical system in the X direction may be employed. For example, as a configuration for changing the position of at least the part of the light receiving optical system, the Y-direction driving means having the drive source (for example, a motor) and moving the position of at least the part of the light receiving optical system in the Y direction may be employed. For example, as a configuration for changing the position of at least the part of the light receiving optical system, the Z-direction driving means having the drive source (for example a motor) and moving the position of at least the part of the light receiving optical system in the Z direction may be employed. For example, as a configuration for changing the position of at least the part of the light receiving optical system, the rotation driving means having the drive source (for example, a motor) and rotating the position of at least the part of the light receiving optical system may be employed. Further, for example, as a configuration for changing the position of at least the part of the light receiving optical system, at least one of the X-direction driving means, the Y-direction driving means, the Z-direction driving means, and the rotation driving means may be employed. It is needless to say that a configuration for changing the position of at least the part of the light receiving optical system is not limited to the above-described driving means and a configuration in which driving means for changing the position of at least the part of the light receiving optical system in a direction different from the above-described direction may be employed.

Further, for example, as a configuration for changing the position of at least the part of the light receiving optical system, scanning means having an optical scanner and scanning the optical scanner may be employed. In this case, for example, the light receiving position of the reflected light flux may be changed by the light receiving optical system by changing the angle of the optical scanner. In other words, for example, the light receiving position of the reflected light flux may be changed by the light receiving optical system by changing the position of the optical scanner.

For example, as a configuration for changing the position of the groove of the rim of the eyeglass frame, a configuration similar to the configuration of the above-described first change means can be used.

For example, the control of the first change means and the second change means may be controlled at different timings. Further, for example, the control of the first change means and the second change means may be controlled integrally. In addition, for example, at least a part of members may be used both as the configuration of the first change means and the configuration of the second change means.

<Change of Light Receiving Position of Reflected Light Flux>

In the present embodiment, for example, the control means controls the change means to change the light receiving position of the reflected light flux such that the detector receives the reflected light flux of the groove of the rim. For example, the control means may control the change means to change the light receiving position on a detection surface of the detector. In this case, for example, the control means may control the change means to change the light receiving position in at least one of the up-down direction and the left-right direction on the detection surface of the detector.

For example, as a configuration for changing the light receiving position of the reflected light flux such that the detector receives the reflected light flux of the groove of the rim is received, the reflected light flux detected by the detector may be used. In this case, for example, the control means may control the change means to change the light receiving position of the reflected light flux based on the reflected light flux received by the detector. Accordingly, for example, since the light receiving position of the reflected light flux based on the received reflected light flux can be changed, the change can be performed such that the reflected light flux of the rim is received with higher accuracy. Thereby, an excellent cross-sectional shape can be easily acquired.

In addition, for example, as a configuration for changing the light receiving position of the reflected light flux such that the detector receives the reflected light flux of the groove of the rim, the measurement result measured by using a probe pressed against the rim may be used. In this case, for example, in the eyeglass frame shape measurement device, a measurement optical system that traces the contour of the rim and measures the shape of the rim by inserting the probe into the rim of the eyeglass frame and moving and pressing the probe against the rim may be provided. It is needless to say that the shape of the rim may be measured by using the measurement optical system provided in a device different from the eyeglass frame shape measurement device. In this case, the eyeglass frame shape measurement device may receive the measurement result acquired by the different device. For example, the control means may specify the position of any part of the eyeglass frame from the measurement result measured by the measurement optical system, and control the change means to change the light receiving position of the reflected light flux based on the specified position.

In addition, for example, as a configuration for changing the light receiving position of the reflected light flux such that the detector receives the reflected light flux of the groove of the rim, preset rim information may be used. In this case, for example, the control means may change the light receiving position of the reflected light flux such that the detector receives the reflected light flux of the groove of the rim, based on the preset rim information. For example, the control means may estimate the position of the rim from the preset rim information and change the light receiving position of the reflected light flux. For example, the preset rim information may be information on at least a part of the rim to be measured. In this case, for example, the preset rim information may be at least one of design data (data indicating the structure of the rim) of the eyeglass frame to be measured, a lens shape of the eyeglass frame, a camber angle of the eyeglass frame, and a forward tilt angle of the eyeglass frame, and the like.

In addition, for example, the rim information may be acquired by the eyeglass frame shape measurement device receiving the rim information from another device. Further, for example, the rim information may be acquired by the eyeglass frame shape measurement device receiving the input rim information after the rim information is input by the examiner. In this case, for example, the examiner may select desired rim information from the rim information stored in the memory and input the rim information. In this case, for example, the rim information may be transmitted from the memory and input as the examiner connects the memory attachable to and detachable from the eyeglass frame shape measurement device to the eyeglass frame shape measurement device.

For example, based on the reflected light flux, as a configuration for controlling the change means to change the light receiving position of the reflected light flux, the light receiving position of the reflected light flux may be changed based on whether or not the reflected light flux of the groove of the rim is received by the detector. In this case, for example, based on whether or not the reflected light flux of the groove of the rim is received by the detector, the control means may control the change means to change the light receiving position of the reflected light flux such that the detector receives the reflected light flux of the groove of the rim.

For example, as a configuration for controlling the change means based on whether or not the reflected light flux is received, the control means may control the change means by detecting whether or not a predetermined luminance level is detected, and change the light receiving position of the reflected light flux such that the detector receives the reflected light flux of the groove of the rim. In other words, in a case where the reflected light flux can be received by the detector, a predetermined luminance level is detected based on the reflected light flux, and thus, by detecting whether or not the predetermined luminance level is detected, it is possible to confirm whether or not the reflected light flux of the groove of the rim is received by the detector. In this case, for example, in a case where the predetermined luminance level is not detected, the control means may control the change means to change the light receiving position of the reflected light flux such that the predetermined luminance level is detected.

Further, for example, as a configuration for controlling the change means based on whether or not the reflected light flux is received, the control means may control the change means to change the light receiving position of the reflected light flux such that the luminance level satisfies an acceptable level in a case where the luminance level of the reflected light received by the detector has not reached the acceptable level (for example, a predetermined threshold value). In this case, for example, determination means for determining whether or not the luminance level of the reflected light received and detected by the detector satisfies the acceptable level may be provided. For example, the above-described acceptable level may be a preset acceptable level. For example, the acceptable level at which it is determined that the reflected light flux of the groove of the rim is received by the detector may be set in advance by a simulation or an experiment.

For example, based on the reflected light flux, as a configuration for controlling the change means to change the light receiving position of the reflected light flux, the light receiving position of the reflected light flux may be changed based on the light receiving position of the reflected light flux. In this case, for example, the eyeglass frame shape measurement device may include position acquisition means (for example, control portion 50) for acquiring the light receiving position of the reflected light flux. For example, the control means may control the change means to change the light receiving position of the reflected light flux based on the light receiving position of the reflected light flux acquired by the position acquisition means. Accordingly, for example, since the light receiving position of the reflected light flux based on the light receiving position can be changed, an excellent cross-sectional shape can be acquired more easily and accurately.

For example, as the light receiving position of the reflected light flux, the position acquisition means may use the light receiving position of the reflected light flux by at least one part of the rim. In this case, for example, the position acquisition means acquires the light receiving position of the reflected light flux at least at one part of the rim. For example, the control means controls the change means to change the light receiving position of the reflected light flux of the groove of the rim based on the light receiving position at least at one part of the rim acquired by the position acquisition means. Accordingly, since the light receiving position can be changed based on the reflected light flux at a specific part of the rim, the change can be performed such that the reflected light flux of the rim is received with higher accuracy. Thereby, an excellent cross-sectional shape can be more easily acquired.

For example, at least one part of the rim may be at least one of the rim shoulder, the groove of the rim, and the outer surface part (outer portion of the rim) of the rim. In this case, for example, the position acquisition means may acquire the light receiving position of the reflected light flux from at least one part of the rim shoulder, the groove of the rim, and the outer surface part of the rim. For example, the control means controls the change means to change the light receiving position of the reflected light flux of the groove of the rim based on the light receiving position at least at one of the rim shoulder, the groove of the rim, and the outer surface part of the rim which are acquired by the position acquisition means. In addition, for example, the rim shoulder may be at least one of the front rim shoulder and the rear rim shoulder. For example, the groove of the rim may be at least one of the slope of the groove of the rim and the bottom of the groove of the rim. In addition, for example, the slope of the groove of the rim may be one of the front slope of the groove of the rim and the rear slope of the groove of the rim.

For example, the light receiving position of the reflected light flux may be detected from the signal of the reflected light flux. In this case, for example, the position acquisition means may detect the light receiving position of the reflected light flux from the signal of the reflected light flux. For example, the control means may control the change means to change the light receiving position of the reflected light flux of the groove of the rim based on the light receiving position of the reflected light flux detected from the signal of the reflected light flux.

Further, for example, the light receiving, position of the reflected light flux may be detected from the cross-sectional image by acquiring the cross-sectional image from the signal of the reflected light flux. In this case, for example, the acquisition means may acquire the cross-sectional image of the groove of the rim of the eyeglass frame as the cross-sectional shape based on the reflected light flux received by the detector. For example, the position acquisition means may acquire the light receiving position of the reflected light flux by analyzing the cross-sectional image to acquire a position of the cross-sectional image. For example, the control means may control the change means to change the light receiving position of the reflected light flux of the groove of the rim based on the position of the cross-sectional image acquired by the position acquisition means. Accordingly, for example, since the light receiving position of the reflected light flux can be changed by using the cross-sectional image, the light receiving position of the reflected light flux can be more easily specified. Thereby, an excellent cross-sectional shape can be more easily acquired.

For example, as a configuration in which the control means controls the change means to change the light receiving position of the reflected light flux based on the light receiving position, the control means may control the change means to change the light receiving position of the reflected light flux such that the reflected light flux of the groove of the rim is received at a predetermined position of the detector. Accordingly, for example, since the reflected light flux, is received at a predetermined position of the detector, the reflected light flux can be positioned at any position, and thus, it is possible to make it easy to acquire the cross-sectional shape more excellently.

For example, the predetermined position may be any region (for example, a center region in a light receiving region of the detector) of the light receiving regions of the detector. In this case, for example, the control means controls the change means such that the reflected light flux of the groove of the rim is received in the light receiving region. Further, for example, the predetermined position may be a specific position (for example, a center position of the detector) of the detector.

In addition, for example, in a case of controlling the change means to change the light receiving position of the reflected light flux of the groove of the rim based on the position of the cross-sectional image, the control means may control the change means based on the position of the cross-sectional image on a display screen of display means (for example, display 3). For example, the position of the cross-sectional image on the display screen of the display means may be acquired, and the change means may be controlled such that the cross-sectional image falls within the display screen. Further, for example, the control means may acquire the position of the cross-sectional image on the display screen of the display means, and may control the change means such that the cross-sectional image is disposed at a specific position of the display screen.

For example, as a configuration for changing the light receiving position of the reflected light flux such that the reflected light flux of the groove of the rim is received at the predetermined position, deviation information between the predetermined position and the light receiving position may be used. In this case, for example, the control means may acquire the deviation information between the predetermined position and the light receiving position, and may control the change means to change the light receiving position of the reflected light flux of the groove of the rim based on the deviation information. Accordingly, since the light receiving position can be changed based on the deviation information, the reflected light flux of the rim can be easily and accurately received at a predetermined position.

For example, as a configuration for changing the light receiving position of the reflected light flux such that the reflected light flux of the groove of the rim is received at the predetermined position, coordinate positions of the predetermined position and the light receiving position may be changed to match each other. In this case, for example, the control means may control the change means to change the light receiving position of the reflected light flux of the groove of the rim such that the coordinate positions of the predetermined position and the light receiving position match each other.

In addition, for example, in a case of changing the light receiving position of the reflected light flux such that the detector receives the reflected light flux of the groove of the rim, the change of the light receiving position of the reflected light flux may be executed before starting the measurement. In addition, for example, in a case of changing the light receiving position of the reflected light flux such that the detector receives the reflected light flux of the groove of the rim, the change of the light receiving position of the reflected light flux may be executed after the measurement is started. Further, the change of the light receiving position of the reflected light flux may be executed at least at one measurement position in the eyeglass frame. In this case, for example, processing of changing the light receiving position of the reflected light flux such that the detector receives the reflected light flux of the groove of the rim may be performed over the entire periphery of the eyeglass frame. As an example, the control means may perform, in real time, the processing of changing the light receiving position of the reflected light flux such that the detector receives the reflected light flux of the groove of the rim. In addition, in this case, for example, the processing of changing the light receiving position of the reflected light flux may be performed at a certain timing such that the detector receives the reflected light flux of the groove of the rim. For example, the certain timing may be any one of each predetermined vector angle, each elapsed time, and the like.

For example, in a case of executing the change of the light receiving position of the reflected light flux before starting the measurement such that the detector receives the reflected light flux of the groove of the rim, the control means may execute the pre-measurement for changing the light receiving position of the reflected light flux before starting the measurement. For example, after the change means is controlled by the control means and the light receiving position of the reflected light flux is changed, the acquisition means may acquire the cross-sectional shape of the groove of the rim of the eyeglass frame based on the reflected light flux received by the detector.

In this case, for example, the pie-measurement in which the measurement light flux is irradiated and the reflected light flux is received may be performed at least at one measurement position in the eyeglass frame in advance. For example, during the pre-measurement, based on the reflected light flux received by the detector, the control means may control the change means to change the light receiving position of the reflected light flux such that the detector receives the reflected light flux of the groove of the rim. In this case, for example, the pre-measurement in which the contour of the rim is traced and the shape of the rim is measured by pressing the probe against the rim and moving the probe at least at one measurement position in the eyeglass frame may be performed in advance. For example, in the pre-measurement, based on the measured shape of the rim, the control means may control the change means to change the light receiving position of the reflected light flux such that the detector receives the reflected light flux of the groove of the rim. In this case, for example, the pre-measurement in which the outer shape (external appearance) of the eyeglass frame is measured in advance at least at one measurement position in the eyeglass frame. For example, the control means captures the eyeglass frame and detects the position of the rim from the captured eyeglass frame image in the pre-measurement. For example, based on the detected position of the rim, the control means may control the change means to change the light receiving position of the reflected light flux such that the detector receives the reflected light flux of the groove of the rim.

For example, after the light receiving position of the reflected light flux is changed, the acquisition means starts the measurement and acquires the cross-sectional shape of the groove of the rim of the eyeglass frame based on the reflected light flux by received by the detector before starting the measurement. In the pre-measurement, the measurement may be performed at the same measurement position (number of points) as the main measurement. In this case, for example, the control means may detect in advance the measurement position where the reflected light flux of the groove of the rim is not excellently received by the detector from the result of the pre-measurement, and may control the change means to change the light receiving position of the reflected light flux at least at one measurement position where the reflected light flux of the groove of the rim is not excellently received by the detector during the main measurement. As an example, for example, the control means may detect in advance the measurement position where the reflected light flux of the groove of the rim is not excellently received by the detector from the result of the pre-measurement, and may control the change means to change the light receiving position of the reflected light flux at the measurement position where the reflected light flux of the groove of the rim is not excellently received by the detector during the main measurement. In addition, as an example, for example, from the result of the pre-measurement, even at the measurement position where the reflected light flux of the groove of the rim is excellently received by the detector, during the main measurement, the control means may control the change means to change the light receiving position of the reflected light flux such that the detector receives the reflected light flux of the groove of the rim more excellently.

In addition, for example, in a case where the change of the light receiving position of the reflected light flux is executed such that the detector receives the reflected light flux of the groove of the rim after the measurement is started, the control means may control the change means to change the light receiving position of the reflected light flux such that the detector receives the reflected light flux of the groove of the rim after the measurement of the eyeglass frame is started. In this case, for example, the control means may change the light receiving position of the reflected light flux based on the reflected light flux acquired by the measurement after the measurement (main measurement) of the eyeglass frame is started.

For example, during the main measurement, in a case of performing the change of the light receiving position of the reflected light flux, at least at one measurement position, based on the reflected light flux received by the detector, the control means may control the change means to change the light receiving position of the reflected light flux such that the detector receives the reflected light flux of the groove of the rim. In this case, for example, based on the reflected light flux received by the detector, the light receiving position of the reflected light flux at the measurement position where the reflected light flux of the groove of the rim is not excellently received by the detector may be changed, and the control for changing the light receiving position of the reflected light flux may be performed at all measurement positions in the main measurement.

As an example, for example, during the main measurement, the control means may control the change means to change the light receiving position of the reflected light flux at the measurement position where the reflected light flux of the groove of the rim is not excellently received by the detector. In addition, as an example, for example, during the main measurement, even at the measurement position where the reflected light flux of the groove of the rim is excellently received by the detector, the control means may control the change means to change the light receiving position of the reflected light flux such that the detector receives the reflected light flux of the groove of the rim more excellently.

In addition, for example, during the main measurement, at the measurement position detected as the measurement position where the reflected light flux of the groove of the rim is not excellently received by the detector, after the light receiving position is changed, the measurement may be performed again, and the measurement result before changing the light receiving position may be replaced with the measurement result obtained after the light receiving position is changed. In this case, for example, during the main measurement, at the measurement position detected as the measurement position where the reflected light flux of the groove of the rim is not excellently received by the detector, after the light receiving position is changed such that the detector receives the reflected light flux of the groove of the rim excellently, when the re-measurement is completed, the process may move to the measurement to the next measurement position. In other words, the control means may be configured to perform the main measurement in real time and at least at one measurement position while changing the light receiving position such that the detector receives the reflected light flux of the groove of the rim excellently. In other words, for example, during the measurement of the eyeglass frame, the control means may control the change means to change the light receiving position of the reflected light flux in real time such that the detector receives the reflected light flux of the groove of the rim. In addition, in this case, for example, after the main measurement is completed, during the main measurement, at the measurement position detected as the measurement position where the reflected light flux of the groove of the rim is not excellently received by the detector, the control means may perform the re-measurement after the light receiving position is changed such that the detector receives the reflected light flux of the groove of the rim excellently.

In addition, a timing at which the control means changes the light receiving position of the reflected light flux such that the detector receives the reflected light flux of the groove of the rim is not limited to the above-described timing. For example, the control for changing the light receiving position of the reflected light flux may be performed at a timing different from the above-described timing. As an example, in a case where the light receiving position of the reflected light flux is changed such that the detector receives the reflected light flux of the groove of the rim, both before starting the measurement and after starting the measurement, the control means may perform the control for changing the light receiving position of the reflected light flux such that the detector receives the effected light flux of the groove of the rim.

<Acquisition of Shape of Eyeglass Frame>

For example, the eyeglass frame shape measurement device may acquire the shape (shape data) of the eyeglass frame. In this case, for example, the eyeglass frame shape measurement device may include analysis means (for example, control portion 50). For example, the control means may control the first change means to irradiate the groove of the rim at a plurality of vector angles of the eyeglass frame with the measurement light flux. For example, the acquisition means may acquire the cross-sectional shape of the groove of the rim at each of the plurality of vector angles of the eyeglass frame. For example, the analysis means may detect the bottom of the groove of the rim at each of the plurality of vector angles of the eyeglass frame from the cross-sectional shape of the groove of the rim at the plurality of vector angles of the eyeglass frame, and may acquire the shape of the eyeglass frame based on the detected detection result.

For example, the shape of the eyeglass frame may be a two-dimensional shape (two-dimensional shape data). For example, the two-dimensional shape is represented by data in the radius vector direction (XY direction) of the eyeglass frame. Further, for example, the shape of the eyeglass frame may be a three-dimensional shape (three-dimensional shape data). For example, the three-dimensional shape is represented by data in the radius vector direction (XY direction) of the eyeglass frame and in the direction (Z direction) orthogonal to the radius vector direction. In addition, for example, in a case of acquiring the two-dimensional shape, the analysis means may acquire the two-dimensional shape by detecting the position of the groove of the rim in the XY direction from the three-dimensional shape. In this case, for example, the two-dimensional shape may be acquired by projecting the three-dimensional shape onto the XY plane.

For example, in the eyeglass frame shape measurement device, the control means controls the first change means to irradiate the groove of the rim at the plurality of vector angles of the eyeglass frame with the measurement light flux. The acquisition means may acquire the cross-sectional shape of the groove of the rim at each of the plurality of vector angles of the eyeglass frame. The eyeglass frame shape measurement device includes the analysis means for detecting the bottom of the groove of the rim at each of the plurality of vector angles of the eyeglass frame from the cross-sectional shape of the groove of the rim at the plurality of vector angles of the eyeglass frame to acquire the shape of the eyeglass frame based on the detected detection result. Accordingly, unlike the related art, depending on the eyeglass frame, it is possible to suppress a case where the measurement cannot be performed due to detachment of a probe from the groove of the lens frame, and the shape of the eyeglass frame can be acquired easily and accurately with respect to the various shapes of the eyeglass frame.

For example, the shape of the eyeglass frame may be acquired at least at a part of the region within the entire periphery (all parts where the rim is formed at each vector angle) of the rim of the eyeglass frame. In this case, for example, the shape of the eyeglass frame may be acquired in the entire periphery of the rim of the eyeglass frame. In this case, for example, the shape of the eyeglass frame may be acquired at a plurality of regions (for example, the left end region, the right end region, the upper end region, and the lower end region of the eyeglass frame) in the entire periphery of the rim of the eyeglass frame. In addition, in this case, for example, the shape of the eyeglass frame may be acquired at a part of the region in the entire periphery of the rim of the eyeglass frame. In addition, in a case where the shape of the eyeglass frame is not acquired with respect to the entire periphery of the rim of the eyeglass frame, and in a case where the shape of the eyeglass frame of the entire periphery of the rim of the eyeglass frame is to be acquired, the shape of the entire periphery of the rim of the eyeglass frame may be acquired by performing interpolation based on the shape of a part at which the shape of the eyeglass frame is acquired.

<Acquisition of Three-Dimensional Cross-Sectional Shape>

For example, the eyeglass frame shape measurement device may acquire the three-dimensional cross-sectional shape. For example, the control means controls the first change means to irradiate the groove of the rim at a plurality of vector angles of the eyeglass frame with the measurement light flux. For example, the acquisition means may acquire the three-dimensional cross-sectional shape by acquiring the cross-sectional shape of the groove of the rim at each of the plurality of vector angles of the eyeglass frame.

For example, in the present embodiment, in the eyeglass frame shape measurement device, the control means controls the first change means to irradiate the groove of the rim at the plurality of vector angles of the eyeglass frame with the measurement light flux. The acquisition means acquires the cross-sectional shape of the groove of the rim at each of the plurality of vector angles of the eyeglass frame, and acquires the three-dimensional cross-sectional shape. Accordingly, the three-dimensional cross-sectional shape of the eyeglass frame can be acquired easily and accurately.

In addition, for example, the eyeglass frame shape measurement device of the present disclosure may acquire the three-dimensional cross-sectional shape based on the change information when the light receiving position of the reflected light flux is changed such that the detector receives the reflected light flux of the groove of the rim. In this case, for example, the acquisition means may acquire the cross-sectional shape of the groove of the rim at each of a plurality of vector angles of the eyeglass frame, and acquire the three-dimensional cross-sectional shape of the groove of the rim by aligning the cross-sectional shapes based on change information of the change means controlled by the control means when the cross-sectional shapes of the groove of the rim at the plurality of vector angles are acquired. Accordingly, for example, since it is possible to confirm the measurement conditions when the cross-sectional shape is acquired from the change information, the alignment between the cross-sectional shapes of the rim at a plurality of vector angles can be easily performed. Thereby, an excellent three-dimensional shape can be acquired.

For example, the change information may be information, such as at least one of the light projecting optical system and the light receiving optical system, the vector angle, and the light receiving position. In other words, for example, the change information may be information related to a change in the light receiving position of the reflected light flux. For example, the information on the light projecting optical system may be position information on the light source. Further, for example, the information on the light receiving optical system may be position information on the detector.

In addition, for example, the eyeglass frame shape measurement device of the present disclosure may have a configuration in which at least one of the acquisition means, the control means, and the position acquisition means is also used. In addition, for example, a configuration in which the acquisition means, the control means, the position acquisition means are separately provided may be employed.

<Lens Processing>

For example, the cross-sectional shape of the groove of the rim of the eyeglass frame acquired by the eyeglass frame shape measurement device may be used for processing the lens. For example, a lens processing device (for example, lens processing device 300) for processing the peripheral edge of the lens acquires the cross-sectional shape of the groove of the rim of the eyeglass frame acquired by the eyeglass frame shape measurement device.

For example, the eyeglass frame shape measurement device may include transmission means, and the transmission means may transmit the cross-sectional shape of the groove of the rim of the eyeglass frame toward the lens processing device. In this case, for example, the lens processing device may have the receiving means and receive the cross-sectional shape of the groove of the rim of the eyeglass frame transmitted from the eyeglass frame shape measurement device.

In addition, for example, a configuration in which the eyeglass frame shape measurement device is provided in the lens processing device may be employed. In addition, for example, the lens processing device and the eyeglass frame shape measurement device may be devices separated from each other. In this case, the cross-sectional shape of the groove of the rim of the eyeglass frame may be transmitted from the eyeglass frame shape measurement device to the lens processing device at least in one of the wired and wireless manner.

For example, the lens processing device may include processing control means (for example, control portion 310). For example, the processing control means may process the peripheral edge of the lens based on the cross-sectional shape of the groove of the rim of the eyeglass frame acquired by the eyeglass frame shape measurement device. For example, the processing control means may control the lens holding leans and the processing tool for holding the lens and process the peripheral edge of the lens based on the cross-sectional shape of the groove of the rim of the eyeglass frame.

For example, in the present embodiment, the lens processing device includes processing control means for processing the peripheral edge of the lens based on the cross-sectional shape of the groove of the rim of the eyeglass frame. Accordingly, when the processed lens is excellently framed into the eyeglass frame, the shape of the groove of the rim and the contour shape of the processed lens are close to each other, and thus, the framing can be excellently performed.

EXAMPLE

Figure 2:
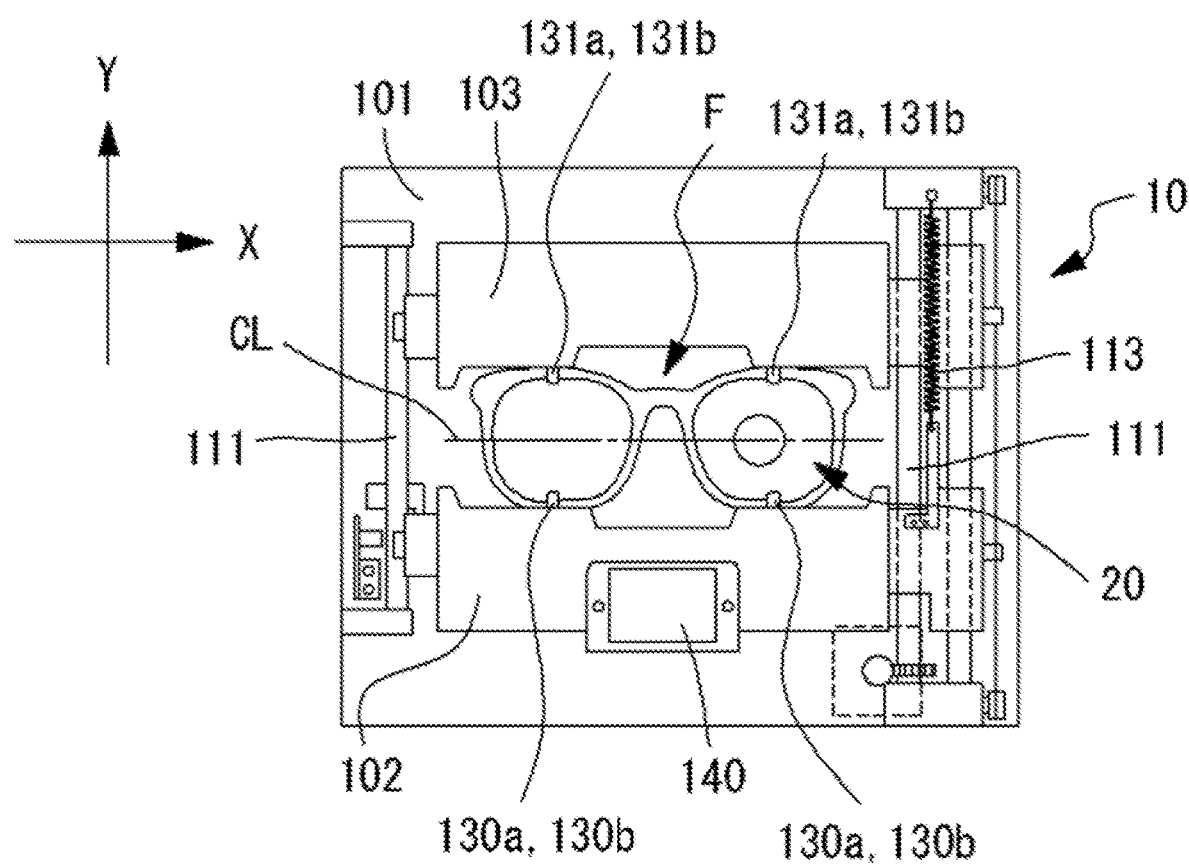
FIG. 2 is a top view of a frame holding unit in a state where an eyeglass frame is held.

One typical example of the present disclosure will be described with reference to the drawings. FIG. 1 is a schematic external view of the eyeglass frame shape measurement device. For example, FIG. 2 is a top view of a frame holding unit in a state where the eyeglass frame is held. For example, in the present example, the eyeglass frame shape measurement device 1 includes a frame holding unit 10 and a measurement unit 20. For example, the frame holding unit 10 holds the eyeglass frame F in a desired state. For example, by emitting the measurement light flux toward the groove of the rim (for example, left rim FL and right rim FR) of the eyeglass frame F held by the frame holding unit 10, and receiving the reflected light flux, the measurement unit 20 is used for acquiring the cross-sectional shape of the groove of the rim of the eyeglass frame F. For example, the measurement unit 20 is disposed under the frame holding unit 10.

For example, the switch portion 4 having a measurement start switch and the like is disposed on the front side of the housing of the eyeglass frame shape measurement device 1. For example, a touch panel type display 3 is disposed on the rear side of the housing of the eyeglass frame shape measurement device 1. For example, when processing the peripheral edge of the lens, lens layout data for the lens shape data, lens processing conditions, and the like are input through the touch panel type display 3. For example, the acquisition results (cross-sectional shape of the groove of the rim, eyeglass frame shape, and the like) obtained by the eyeglass frame shape measurement device 1 and the data input on the display 3 are transmitted to the lens processing device. In addition, the eyeglass frame shape measurement device 1 may be configured to be incorporated in a lens processing device, as in JP-A-2000-314617.

<Frame Holding Unit>

For example, the measurement unit 20 is provided below the frame holding unit 10. For example, a front slider 102 and a rear slider 103 for holding the eyeglass frame F horizontally are placed on a holding unit base 101. For example, the horizontal may mean substantially horizontal. For example, the front slider 102 and the rear slider 103 are slidably arranged facing each other on two rails 111 with a center line CL as a center, and are always pulled in the direction toward the center line CL of both sliders by a spring 113.

For example, in the front slider 102, clamp pins 130a and 130b for clamping the rim of the eyeglass frame F from the thickness direction are respectively disposed at two locations. For example, in the rear slider 103, clamp pins 131a and 131b for clamping the rim of the eyeglass frame F from the thickness direction are respectively disposed at two locations. For example, when measuring a template, the front slider 102 and the rear slider 103 are opened, and a known template holding jig is disposed at a predetermined mounting position 140 and used. As the configuration of the frame holding unit 10, for example, a known configuration described in JP-A-2000-314617 can be used.

For example, in the eyeglass frame F, the lower side of the rim when wearing the eyeglasses is positioned on the front slider 102 side, and the upper side of the rim is positioned on the rear slider 103 side. For example, the eyeglass frame F is held in a predetermined measurement state by clamp pins positioned on each of the lower side and the upper side of the left and right ring.

In the present example, as a configuration for regulating the position of the rim in the front-rear direction, a configuration of the clamp pins 130a and 130b and the clamp pins 131a and 131b has been described as an example, but the configuration is not limited thereto. A known mechanism may be used. For example, as a mechanism for fixing the front-rear direction of the left and right rims, a configuration in which contact members (regulating members) having a V-shaped groove are respectively provided for the left and right rims may be employed.

<Measurement Unit>

Hereinafter, a configuration of the measurement unit 20 will be described. For example, the measurement unit 20 includes an eyeglass frame measurement optical system 30. For example, the eyeglass frame measurement optical system 30 includes the light projecting optical system 30a and the light receiving optical system 30b. For example, the light projecting optical system 30a and the light receiving optical system 30b are used for acquiring the shape of the eyeglass frame and the cross-sectional shape of the groove of the rim of the eyeglass frame (details will be described later).

For example, the measurement unit 20 includes a holding unit 25 that holds the light projecting optical system 30a and the light receiving optical system 30b. For example, the measurement unit 20 includes the moving unit 210 that moves the holding unit 25 in the XYZ directions (refer to, for example, FIGS. 3 to 5). For example, the measurement unit 20 includes a rotation unit 260 that rotates the holding unit 25 with a rotation shaft L0 as a center (refer to, for example, FIG. 6). For example, in the present example, the XY direction is a direction parallel to the measurement plane (the radius vector direction of the rim) of the eyeglass frame F held by the frame holding unit 10, and the Z direction is a direction orthogonal to the measurement plane.

<Moving Unit>

Figure 3:
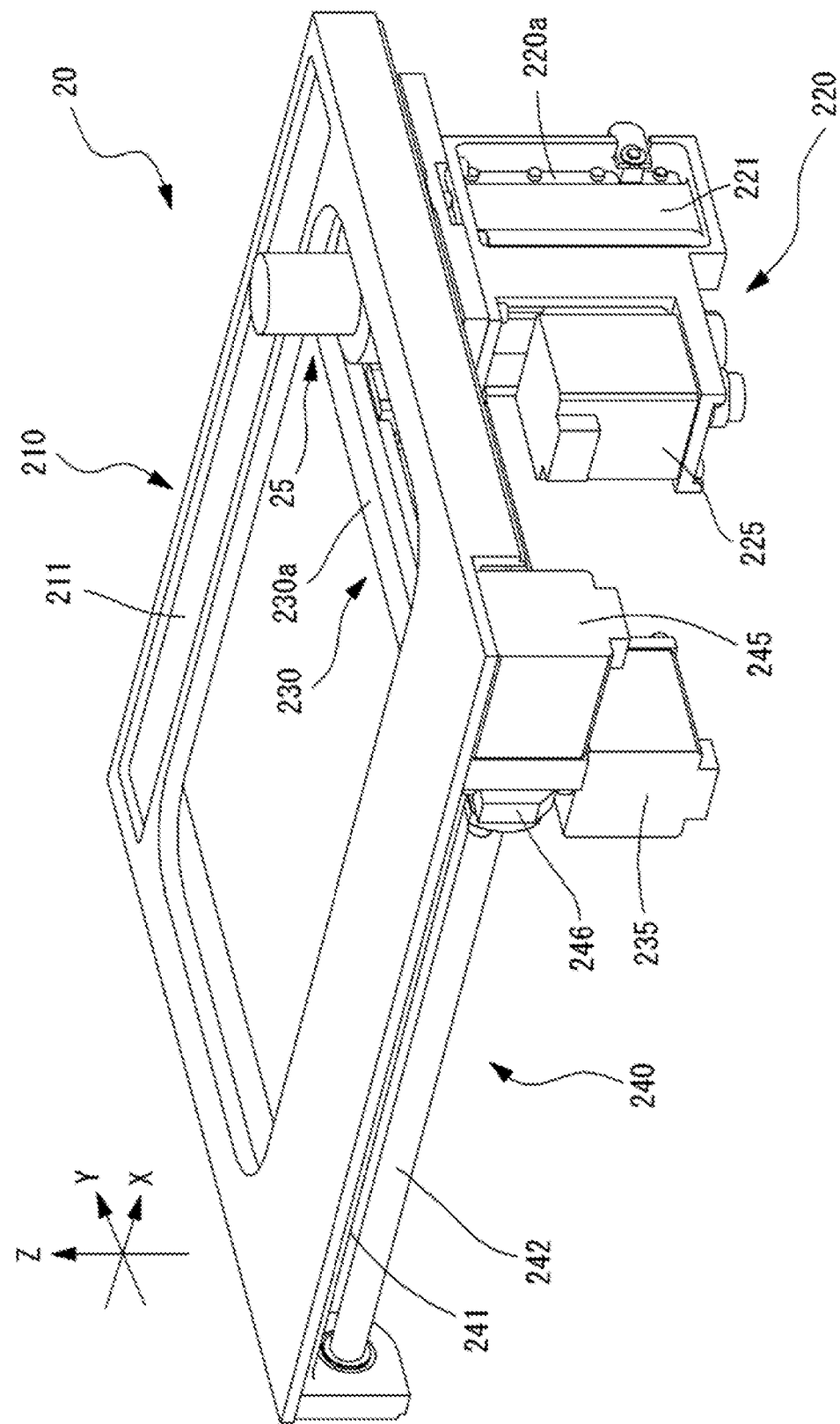
FIG. 3 illustrates a perspective view of a moving unit when viewed from above.
Figure 4:
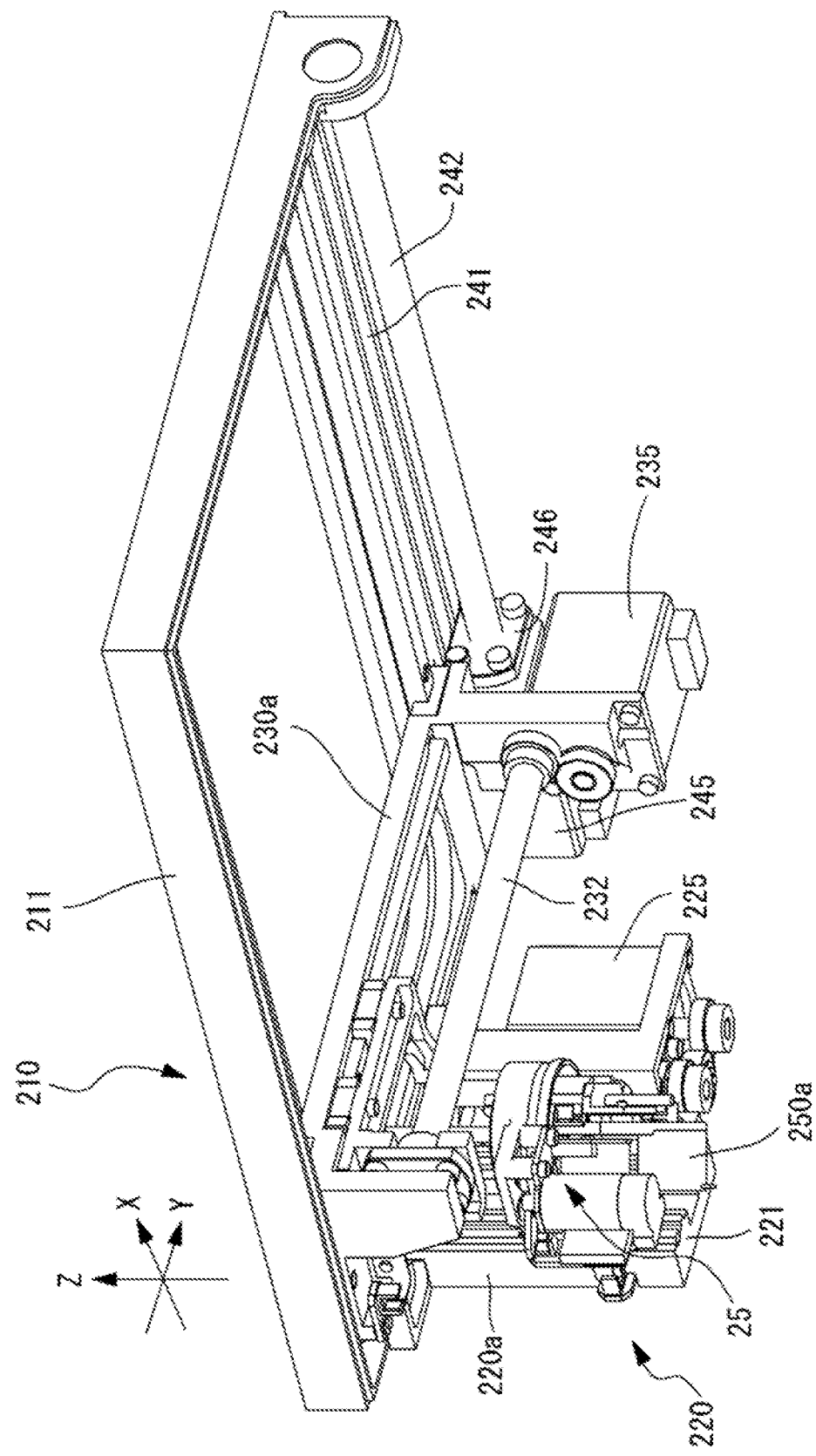
FIG. 4 illustrates a perspective view of the moving unit when viewed from below.
Figure 5:
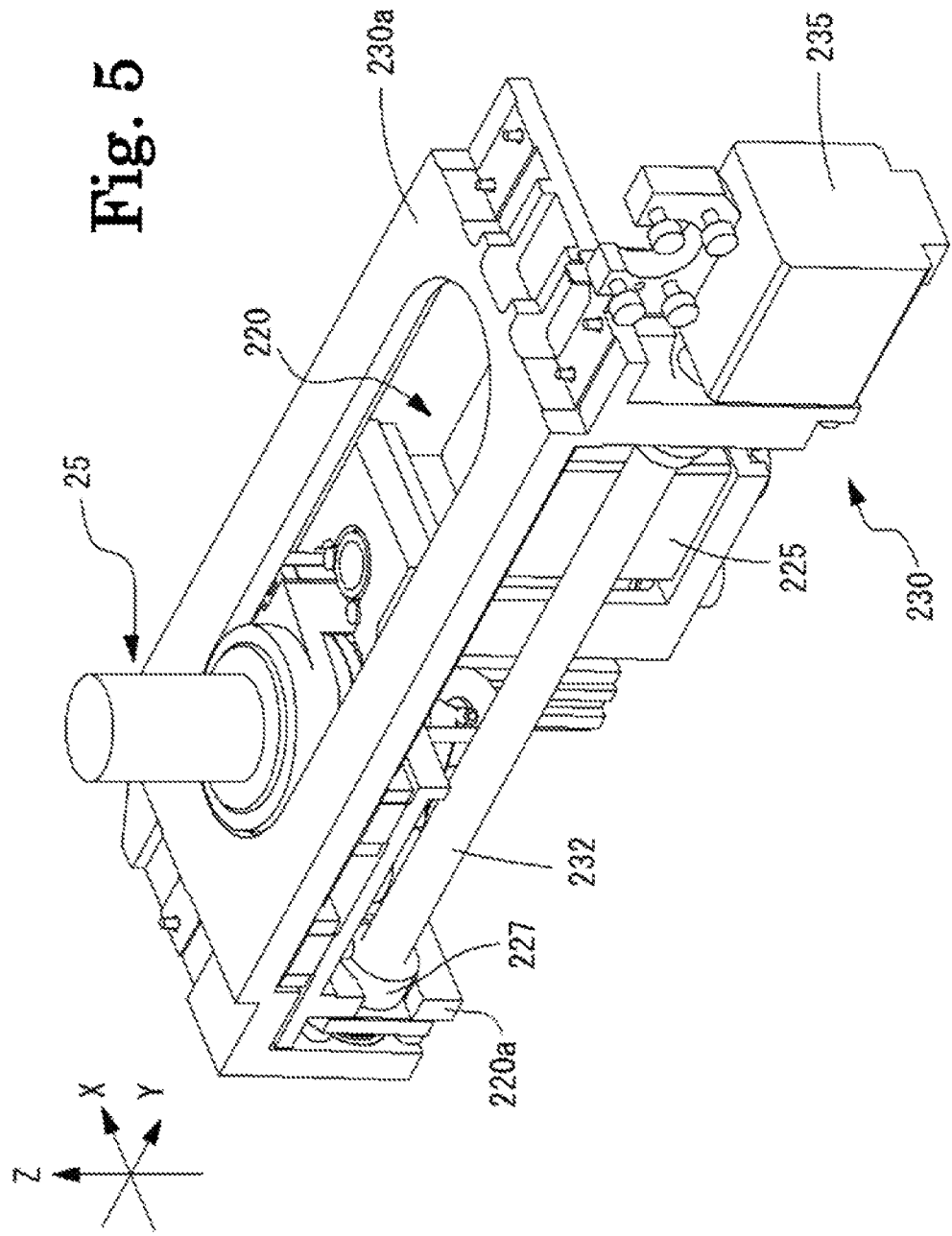
FIG. 5 illustrates a top perspective view of a Z moving unit and a Y moving unit.

Hereinafter, the moving unit 210 will be described. For example, FIGS. 3 to 5 are views for describing the configuration of the moving unit 210. For example, FIG. 3 illustrates a perspective view of the moving unit 210 when viewed from above. For example, FIG. 4 illustrates a perspective view of the moving unit 210 when viewed from below. For example, FIG. 5 illustrates a top perspective view of a Z moving unit 220 and a Y moving unit 230 (a perspective view in a state where an X moving unit 240 and a base portion 211 are removed).

For example, the moving unit 210 roughly includes the Z moving unit (Z-direction driving means) 220, the Y moving unit (Y-direction driving means) 230, and the X moving unit (X-direction driving means) 240. For example, the Z moving unit (Z-direction driving means) 220 moves the holding unit 25 in the Z direction. For example, the Y moving unit 230 holds and moves the holding unit 25 and the Z moving unit 220 in the Y direction. For example, the X moving unit 240 moves the holding unit 25 in the X direction together with the Z moving unit 220 and the Y moving unit 230.

For example, the X moving unit 240 is schematically configured as follows. For example, the X moving unit 240 includes a guide rail 241 that extends in the X direction below the base portion 211 having a rectangular frame that stretches in the horizontal direction (XY direction). For example, a Y base 230a of the Y moving unit 230 is attached along the guide rail 241 so as to be movable in the X direction. For example, a motor (drive source) 245 is attached to the base portion 211. For example, a feed screw 242 that extends in the X direction is attached to the rotation shaft of the motor 245. For example, a nut portion 246 fixed to the Y base 230a is screwed to the feed screw 242. Accordingly, when the motor 245 is rotated, the Y base 230a is moved in the X direction. For example, the movement range in the X direction of the X moving unit 240 may have a length by which the Y base 230a with the holding unit 25 mounted thereon can be moved more than the horizontal width of the eyeglass frame in order to make the left and right lens frames of the eyeglass frame measurable.

For example, the Y moving unit 230 is schematically configured as follows. For example, a guide rail 231 that extends in the Y direction is attached to the Y base 230a. For example, a Z base 220a is attached along the guide rail 231 so as to be movable in the Y direction. For example, a Y movement motor (drive source) 235 and a feed screw 232 that extends in the Y direction are rotatably attached to the Y base 230a. For example, the rotation of the motor 235 is transmitted to the feed screw 232 via a rotation transmission mechanism, such as a gear. For example, a nut 227 attached to the Z base 220a is screwed to the feed screw 232. With these configurations, when the motor 235 is rotated, the Z base 220a is moved in the Y direction.

For example, the X moving unit 240 and the Y moving unit 230 configure an XY moving unit. For example, the range in which the holding unit 25 is moved in the XY directions is larger than the measurable rim radius vector. For example, the movement position of the holding unit 25 in the XY direction is detected by the number of pulses by which the motors 245 and 235 are driven by the control portion 50 which will be described later, and a first XY position detection unit that detects the position of the holding unit 25 in the XY direction is configured with the motors 245 and 235 and the control portion 50. For example, the XY position detection unit of the holding unit 25 may be configured to use sensors, such as encoders attached to each of the rotation shafts of the motors 245 and 235 in addition to detection by pulse control of the motors 245 and 235.

For example, the Z moving unit 220 is schematically configured as follows. For example, a guide rail 221 that extends in the Z direction is formed on the Z base 220a, and a moving base 250a to which the holding unit 25 is attached is held along the guide rail 221 so as to be movable in the Z direction. For example, a pulse motor 225 for the Z movement is attached to the Z base 220a, and a feed screw (not illustrated) that extends in the Z direction is rotatably attached. For example, it is screwed into a nut attached to the base 250a of the holding unit 25. For example, the rotation of the motor 225 is transmitted to a feed screw 222 via a rotation transmission mechanism, such as a gear, and the holding unit 25 is moved in the Z direction by the rotation of the feed screw 222. The movement position of the holding unit 25 in the Z direction is detected by the number of pulses by which the motor 225 is driven by the control portion 50 which will be described later, and a Z position detection unit that detects the position of the holding unit 25 in the Z direction is configured with the motor 225 and the control portion 50. For example, the Z position detection unit of the holding unit 25 may be configured to use sensors, such as encoders attached to the rotation shaft of the motor 225 in addition to detection by pulse control of the motor 225.

In addition, each moving mechanism in the X direction, the Y direction, and the Z direction as described above is not limited to the example, and a known mechanism can be adopted. For example, instead of moving the holding unit 25 in a straight line, a configuration in which the holding unit 25 is moved by starting an arc with respect to the center of the rotation base may be employed (refer to, for example, JP-A-2006-350264).

<Rotation Unit>

Figure 6:
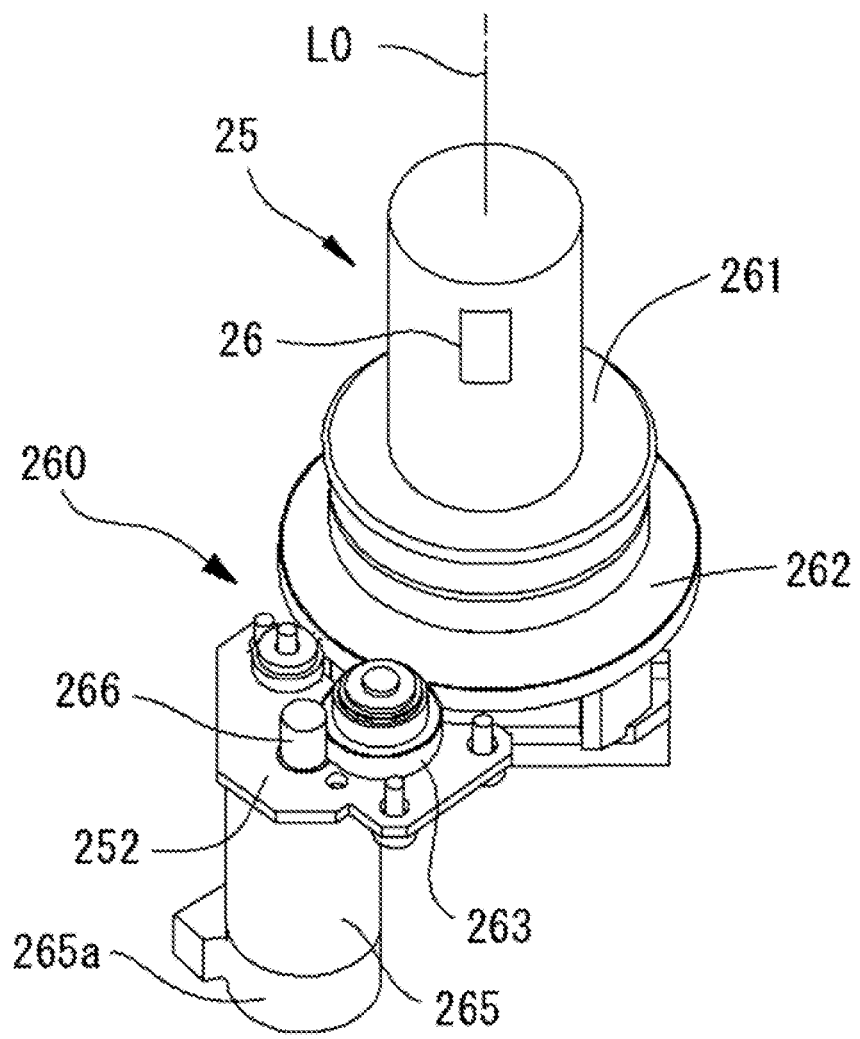
FIG. 6 is a view for describing a rotation unit.

Next, the rotation unit 260 will be described. For example, FIG. 6 is a view describing the rotation unit 260.

For example, the holding unit 25 is provided with an opening portion 26. For example, the opening portion 26 allows the measurement light flux from the light projecting optical system 30a to pass and allows the reflected light flux reflected by the eyeglass frame F to pass. For example, the opening portion 26 may be provided with a transparent panel that covers the opening portion 26. For example, the opening portion 26 emits the measurement light flux emitted from the light projecting optical system 30a from the inside of the holding unit 25 to the outside. In other words, the measurement light flux from the light projecting optical system 30a passes through the opening portion 26 and is emitted toward the groove of the rim of the eyeglass frame F. For example, the opening portion 26 allows the reflected light flux reflected by the groove of the rim of the eyeglass frame F to pass from the outside of the holding unit 25 toward the light receiving optical system 30b inside the holding unit 25. In other words, the reflected light flux reflected by the groove of the rim of the eyeglass frame F passes through the opening portion 26 and is received by the light receiving optical system 30b.

For example, the rotation unit 260 changes the XY direction in which the opening portion 26 faces by rotating the holding unit 25 with the rotation shaft LO that extends in the Z direction as a center. For example, the rotation unit 260 includes a rotation base 261. For example, the holding unit 25 is attached to the rotation base 261. For example, the rotation base 261 is held rotatably with the rotation shaft LO that extends in the Z direction as a center. For example, a large-diameter gear 262 is formed at the outer periphery of the lower portion of the rotation base 261. For example, the rotation unit 260 has an attachment plate 252. For example, a motor (drive source) 265 is attached to the attachment plate 252. For example, a pinion gear 266 is fixed to the rotation shaft of the motor 265, and the rotation of the pinion gear 266 is transmitted to the large-diameter gear 262 via a gear 263 that is rotatably provided on the attachment plate 252. Therefore, the rotation base 261 is rotated around the rotation shaft LO by the rotation of the motor 265. For example, the rotation of the motor 265 is detected by an encoder (sensor) 265a integrally attached to the motor 265, and the rotation angle of the rotation base 261 (that is, holding unit 25) is detected from the output of the encoder 265a. The origin position of the rotation of the rotation base 261 is detected by an origin position sensor (not illustrated). In addition, each moving mechanism of the above rotation units 260 is not limited to the example, and a known mechanism can be adopted.

In the present example, the rotation shaft LO of the rotation unit 260 is set as a shaft that passes through the light source 31 of the light projecting optical system 30a which will be described later. In other words, the rotation unit 260 rotates with the light source 31 of the light projecting optical system 30a as a center. It is needless to say that the rotation shaft of the rotation unit 260 may be a rotation shaft at a different position. For example, the rotation shaft LO of the rotation unit 260 may be set to a shaft that passes through the detector 37 of the light receiving optical system 30b which will be described later.

<Eyeglass Frame Measurement Optical System>

Figure 7:
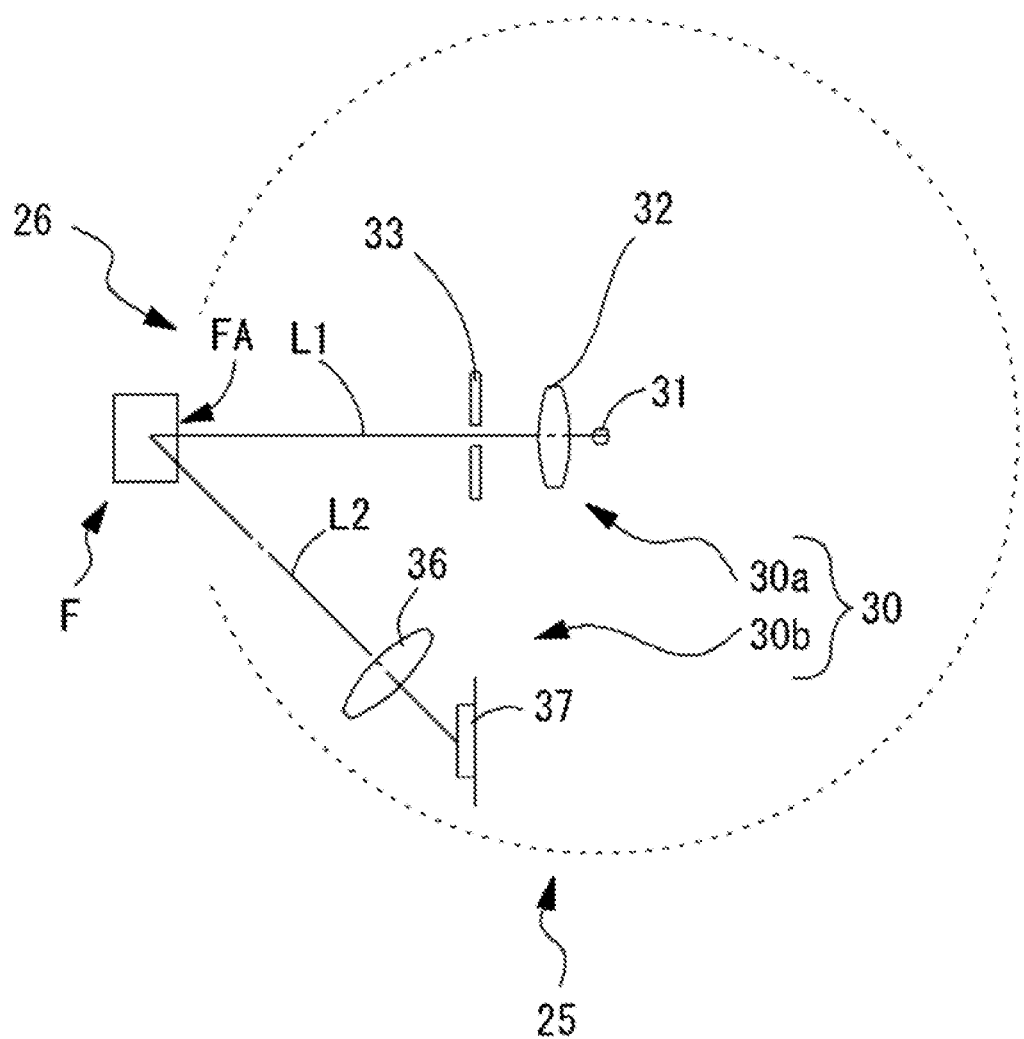
FIG. 7 is a schematic configuration view illustrating an eyeglass frame measurement optical system.

Next, the eyeglass frame measurement optical system 30 held by the holding unit 25 will be described. For example, FIG. 7 is a schematic configuration view illustrating the eyeglass frame measurement optical system 30. For example, the eyeglass frame measurement optical system 30 is used for acquiring the eyeglass frame F. For example, in the present example, the eyeglass frame measurement optical system 30 is used for acquiring the cross-sectional shape of the groove of the rim of the eyeglass frame F. In addition, for example, in the present example, the eyeglass frame measurement optical system 30 is used for measuring the shape of the eyeglass frame F.

For example, in the present example, the eyeglass frame measurement optical system 30 is disposed inside the holding unit 25. For example, the eyeglass frame measurement optical system 30 is configured with the light projecting optical system 30a and the light receiving optical system 30b. For example, the light projecting optical system 30a has the light source and emits the measurement light flux from the light source toward the groove of the rim of the eyeglass frame F. For example, the light receiving optical system 30b has the detector and causes the detector to receive the reflected light flux of the measurement light flux emitted toward the groove of the rim of the eyeglass frame F by the light projecting optical system 30a and reflected by the groove of the rim of the eyeglass frame F.

For example, in the present example, the eyeglass frame measurement optical system 30 is configured to acquire the cross-sectional shape of the groove of the rim of the eyeglass frame F based on the Scheimpflug principle. For example, the light projecting optical system 30a irradiates the groove of the rim of the eyeglass frame with slit light. For example, the light receiving optical system 30b has an optical axis L2 inclined with respect to the optical axis L1 irradiated with the slit light, and includes a lens and a detector that are arranged based on the Scheimpflug principle. It is needless to say that the eyeglass frame measurement optical system 30 may be an optical system having a different configuration instead of an optical system based on the Scheimpflug principle. The eyeglass frame measurement optical system 30 may be an optical system that acquires the cross-sectional shape of the groove of the rim of the eyeglass frame F.

In the example, a configuration in which the light projecting optical system 30a and the light receiving optical system 30b are integrally moved is described as an example, but the present disclosure is not limited thereto. For example, at least in one of the driving means among the X moving unit 240, the Y moving unit 230, the Z moving unit 220, and the rotation unit 260, the light projecting optical system 30a and the light receiving optical system 30b may be configured to be separately moved, respectively.

<Light Projecting Optical System>

For example, the light projecting optical system 30a includes the light source 31, a lens 32, and a slit plate 33. For example, the measurement light flux emitted from the light source 31 is condensed by the lens 32 and illuminates the slit plate 33. For example, the measurement light flux that illuminates the slit plate 33 becomes the measurement light flux limited to a narrow slit shape by the slit plate 33 and is emitted onto a groove FA of the rim of the eyeglass frame F. In other words, for example, slit light is emitted to the groove FA of the rim of the eyeglass frame F. Accordingly, the groove FA of the rim of the eyeglass frame F is illuminated in the form of being light-cut by the slit light.

<Light Receiving Optical System>

For example, the light receiving optical system 30b includes a lens 36 and a detector (for example, light receiving element) 37. For example, the light receiving optical system 30b is configured to acquire the cross-sectional shape from an oblique direction with respect to the groove FA of the rim of the eyeglass frame F. For example, the light receiving optical system 30b is configured to acquire the cross-sectional shape of the groove FA of the rim of the eyeglass frame F based on the Scheimpflug principle.

For example, the lens 36 leads the reflected light flux (for example, scattered light from the groove FA of the rim, regular reflected light from the groove FA of the rim, and the like) from the groove FA of the rim acquired by the reflection at the groove FA of the rim to the detector 37. For example, the detector 37 has a light receiving surface disposed at a position substantially conjugating with the groove FA of the rim of the eyeglass frame F. For example, the light receiving optical system 30*b* has the imaging optical axis L2 that is inclined with respect to the light projecting optical axis L1 of the light projecting optical system 30*a*, and has the lens 36 and the detector 37 that are disposed based on the Scheimpflug principle. The light receiving optical system 30*b* is disposed such that the optical axis (imaging optical axis) L2 intersects with the optical axis L1 of the light projecting optical system 30*a* at a predetermined angle. For example, a cross section of light emitted onto the groove FA of the rim of the eyeglass frame F by the light projecting optical system 30*a*, and a light receiving surface (light receiving position) of a lens system (the groove FA of the rim of the eyeglass frame F and the lens 36) including the groove FA of the rim of the eyeglass frame F and the detector 37 are disposed in the Scheimpflug relationship.

<Control Means>

Figure 8:
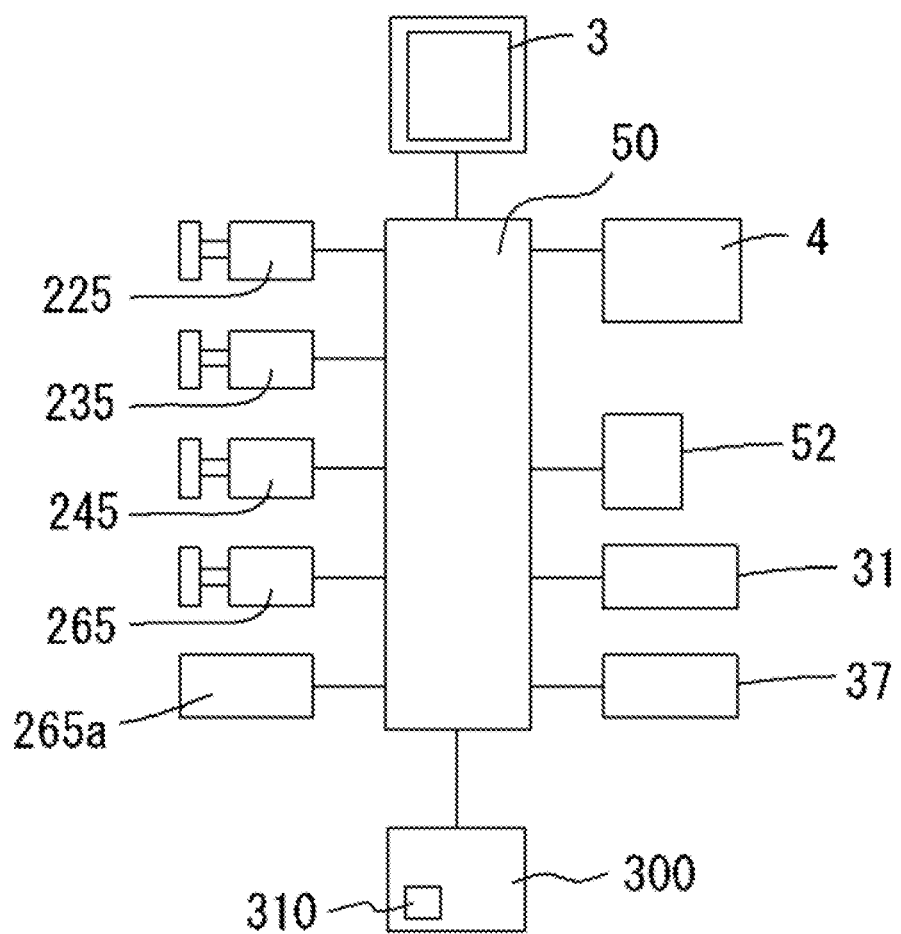
FIG. 8 is a control block diagram related to the eyeglass frame shape measurement device.

FIG. 8 is a control block diagram related to the eyeglass frame shape measurement device 1. The control portion 50 is connected to a non-volatile memory (storage means) 52, the display 3, the switch portion 4, and the like.

For example, the control portion 50 includes a CPU (processor), a RAM, a ROM, and the like. The CPU of the control portion 50 controls the entire device, such as each unit (for example, the light source 31, the detector 37, the encoder 265*a*) and driving means (for example, the drive source of the frame holding unit 10, each of the motors 225, 235, 245, and 265) of each unit, and the like. Further, for example, the control portion 50 functions as arithmetic means (analysis means) for performing various arithmetic operations (for example, calculation of the shape of the eyeglass frame based on output signals from each sensor). The RAM temporarily stores various pieces of information. Various programs for controlling the operation of the entire device, initial values, and the like are stored in the RUM of the control portion 50. The control portion 50 may be configured with a plurality of control portions (that is, a plurality of processors). The non-volatile memory (storage means) 52 is a non-transitory storage medium that can hold stored contents even when power supply is interrupted. For example, a hard disk drive, a flash ROM, a USB memory or the like that is attachable to and detachable from the eyeglass frame shape measurement device 1 can be used as the non-volatile memory (memory) 52.

For example, the control portion 50 is connected to the lens processing device 300 that processes the peripheral edge of the lens. For example, various pieces of data acquired by the eyeglass frame shape measurement device 1 are transmitted to the control portion 310 of the lens processing device 300. The control portion 310 of the lens processing device 300 performs lens processing by controlling each unit of the lens processing device 300 and driving means of each unit based on the received various pieces of data. It is needless to say that the lens processing device 300 and the eyeglass frame shape measurement device 1 may be an integrally configured device.

For example, in the present example, the display 3 is a touch panel type display. In other words, in the present example, since the display 3 is a touch panel, the display 3 functions as an operation portion. In this case, the control portion 50 receives an input signal by a touch panel function of the display 3 and controls display or the like of figures and information on the display 3. It is needless to say that the eyeglass frame shape measurement device 1 may be configured to be provided with the operation portion separately. In this case, for example, at least one of a mouse, a joystick, a keyboard, a touch panel, and the like may be used as the operation portion. It is needless to say that both the display 60 and the operation portion may be used and the eyeglass frame shape measurement device 1 may be operated. In the present example, a configuration in which the display 60 functions as an operation portion and the switch portion (operation portion) 4 is separately provided will be described as an example.

<Control Operation>

The operation of the device having the configuration above will be described. For example, the operator causes the frame holding unit 10 to hold the eyeglass frame F. For example, the operator causes the frame holding unit 10 to hold the eyeglass frame F such that the left and right rims FL and FR of the eyeglass frame F are downward and the left and right temples FTL and FTR of the eyeglass frame F are upward.

For example, when the eyeglass frame F is held by the frame holding unit 10, the operator operates the switch portion 4 to start the measurement. For example, when a trigger signal for starting the measurement is output, the control portion 50 drives at least one of the X moving unit 240, the Y moving unit 230, the Z moving unit 220, and the rotation unit 260 to move the holding unit 25 (the light projecting optical system 30*a* and the light receiving optical system 30*b*) and start the measurement of the rim of the eyeglass frame F. For example, in the present example, the measurement of the rim is started from the right rim FR. It is needless to say that the measurement may be started from the left rim FL.

For example, the control portion 50 moves the holding unit 25 and measures the rim contour of the eyeglass frame by the eyeglass frame measurement optical system 30 (the light projecting optical system 30*a* and the light receiving optical system 30*b*) to acquire the cross-sectional shape of the groove of the rim of the eyeglass frame. In the present example, the light projecting optical system 30*a* and the light receiving optical system 30*b* are moved with respect to the eyeglass frame F in a state where the Scheimpflug relationship is maintained. In other words, the cross-sectional shape of the groove of the rim of the eyeglass frame F can be acquired by moving the eyeglass frame measurement optical system 30 so as to have a certain positional relationship with respect to the groove of the rim of the eyeglass frame F.

For example, when the trigger signal for starting the measurement is output, the control portion 50 controls driving of the moving unit 210 (at least one of the X moving unit 240, the Y moving unit 230, and the Z moving unit 220) and the rotation unit 260, and moves the holding unit 25 placed at a retracted position to the initial position for starting the measurement. For example, at the initial position for starting the measurement, the holding unit 25 is set at the center position of the clamp pins 130*a* and 130*b* and the clamp pins 131*a* and 131*b* on the lower end side of the right rim FR. It is needless to say that the initial position for starting the measurement can be set to any position.

For example, when the holding unit 25 is moved to the initial position for starting the measurement, the control portion 50 turns on the light source 31. Then, the light source 31 is turned on, and the control portion 50 controls driving of at least one of the moving unit 210 and the rotation unit 260 in order to irradiate the groove of the rim at a predetermined position of the eyeglass frame F with the measurement light flux.

Figure 9A:
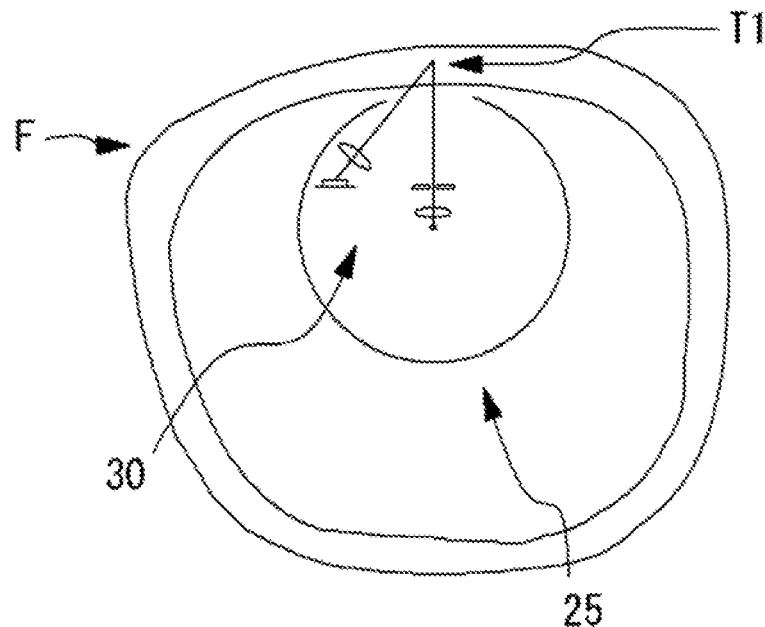
FIG. 9A is a view for describing an example of a case where the rotation unit is controlled to acquire a cross-sectional shape of a rim at a different vector angle.
Figure 9B:
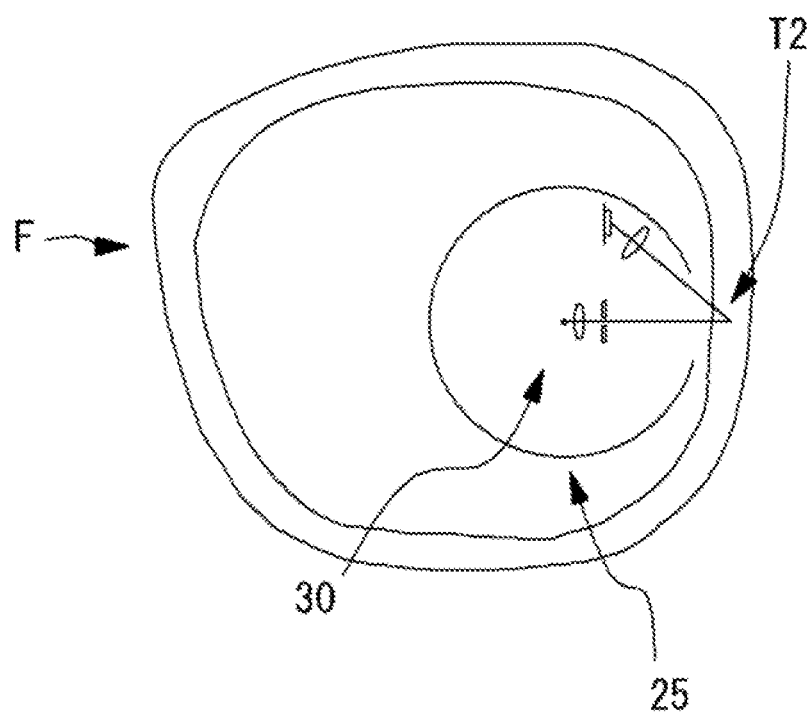
FIG. 9B is a view for describing an example of a case where a cross-sectional shape of the rim at a different vector angle is acquired.

For example, in the present example, in a case of setting the position for acquiring the cross-sectional shape of the groove of the rim, the control portion 50 controls the rotation unit 260 and sets the acquisition position. FIG. 9 is a view for describing a case where the rotation unit 260 is controlled to acquire the cross-sectional shape of rim at different vector angles. In FIGS. 9A and 9B, the cross-sectional shapes of the rim are acquired at different vector angles.

For example, the control portion 50 controls the rotation unit 260 to rotate the optical axis L1 of the light projecting optical system 30a on the XY plane and move the optical axis L1 of the light projecting optical system 30a in the peripheral direction of the rim. In other words, the control portion 50 controls the X rotation unit 260 to change the vector angle for acquiring the cross-sectional shape of the groove of the rim. For example, by controlling the rotation unit 260, an irradiation position T1 of the light projecting optical system 30a is changed to an irradiation position T2 of the light projecting optical system 30a.

For example, in the present example, in a case where the position for acquiring the cross-sectional shape of the groove of the rim is set and the irradiation position of the measurement light flux with respect to the groove of the rim is changed, the moving unit 210 (at least one of the X moving unit 240, the Y moving unit 230, and the Z moving unit 220) is controlled, and the irradiation position of the measurement light flux is changed such that the groove of the rim is irradiated with the measurement light flux.

In the present example, the setting of the position for acquiring the cross-sectional shape of the groove of the rim and the change of the irradiation position of the measurement light flux with respect to the groove of the rim may be performed simultaneously. Further, for example, not only the rotation unit 260 but also at least one of the X moving unit 240, the Y moving unit 230, and the Z moving unit 220 may be used for setting the position for acquiring the cross-sectional shape of the groove of the rim. Further, the setting of the position for acquiring the cross-sectional shape of the groove of the rim may be performed by at least one of the X moving unit 240, the Y moving unit 230, and the Z moving unit 220. Further, for example, not only at least one of the X moving unit 240, the Y moving unit 230, and the Z moving unit 220 but also the rotation unit 260 may be used for changing the irradiation position of the measurement light flux with respect to the groove of the rim. Further, for example, only the rotation unit 260 may be used for changing the irradiation position of the measurement light flux with respect to the groove of the rim.

For example, as the light source 31 is turned on, the groove of the rim of the eyeglass frame F is light-cut by the slit light. The reflected light flux from the groove of the rim of the eyeglass frame F light-cut by the slit light is directed to the light receiving optical system 30b and received by the detector 37. For example, the control portion 50 acquires the two-dimensional cross-sectional shape of the groove of the rim of the eyeglass frame based on the reflected light flux received by the detector 37. In the present example, a cross-sectional image is acquired as the cross-sectional shape. It is needless to say that the cross-sectional shape may be acquired as a signal.

Here, depending on the shape of the eyeglass frame F, the detector 37 does not receive the reflected light flux of the groove of the rim excellently, and there is a case where that it is difficult to excellently acquire the cross-sectional shape (in the present example, cross-sectional image) of the groove of the rim. For example, in a case where the groove of the rim of the eyeglass frame F is not irradiated with the measurement light flux, it becomes difficult to acquire the cross-sectional shape. Further, for example, in a case where the position where the reflected light flux of the measurement light flux is received by the groove of the rim of the eyeglass frame F is not excellent, it becomes difficult to acquire the cross-sectional shape Therefore, in a case where the reflected light flux of the groove of the rim is not excellently received by the detector 37, the control portion 50 changes the light receiving position of the reflected light flux such that the detector 37 receives the reflected light flux of the groove of the rim. Hereinafter, the control for changing the light receiving position of the reflected light flux such that the detector 37 receives the reflected light flux of the groove of the rim will be described. In addition, as an example of a state where the reflected light flux of the groove of the rim is not excellently received by the detector 37, a state where the cross-sectional image of the groove of the rim is not displayed, a state where only a part of the cross-sectional image of the groove of the rim is displayed, a state where the cross-sectional image of the groove of the rim is displayed but not displayed at the set predetermined position or the like can be employed.

For example, as a state where the reflected light flux of the groove of the rim is not excellently received by the detector 37, a case where the cross-sectional image of the rim is not excellently displayed in at least one of the depth direction (the up-down direction on the paper surface of FIG. 13) and the left-right direction (the left-right direction on the paper surface of FIG. 13) can be employed. In addition, in the present example, a case where the cross-sectional image is not excellently displayed in the depth direction will be described as an example.

Figure 10:
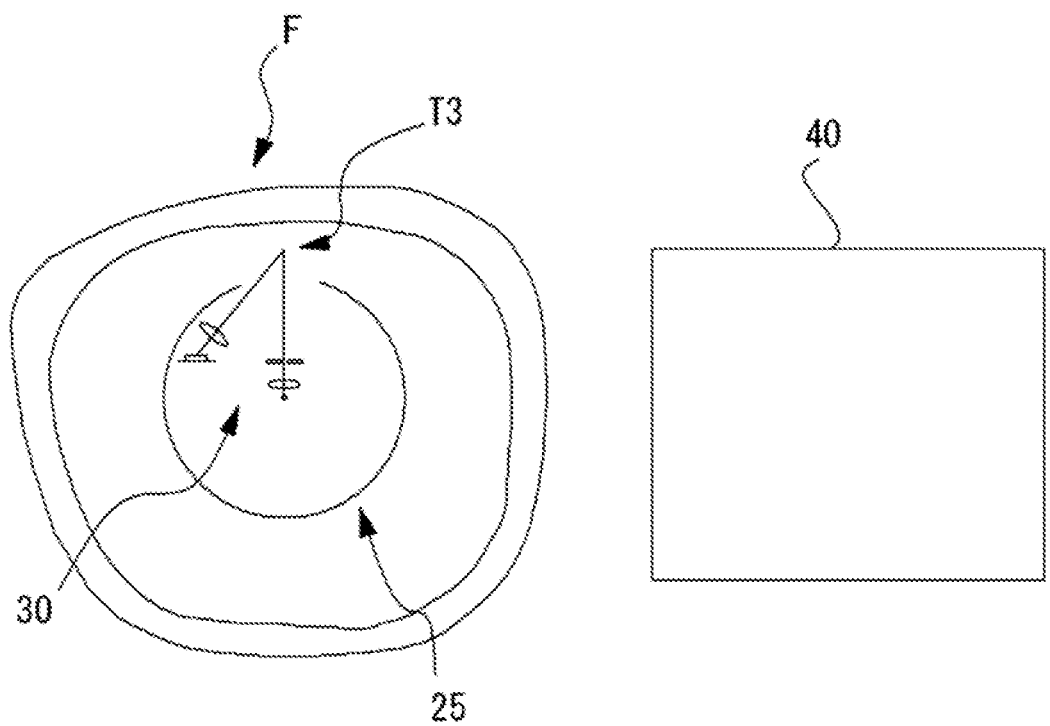
FIG. 10 is a view illustrating a light reception result before moving a holding unit such that a groove of the rim of the eyeglass frame is irradiated with a measurement light flux.
Figure 11:
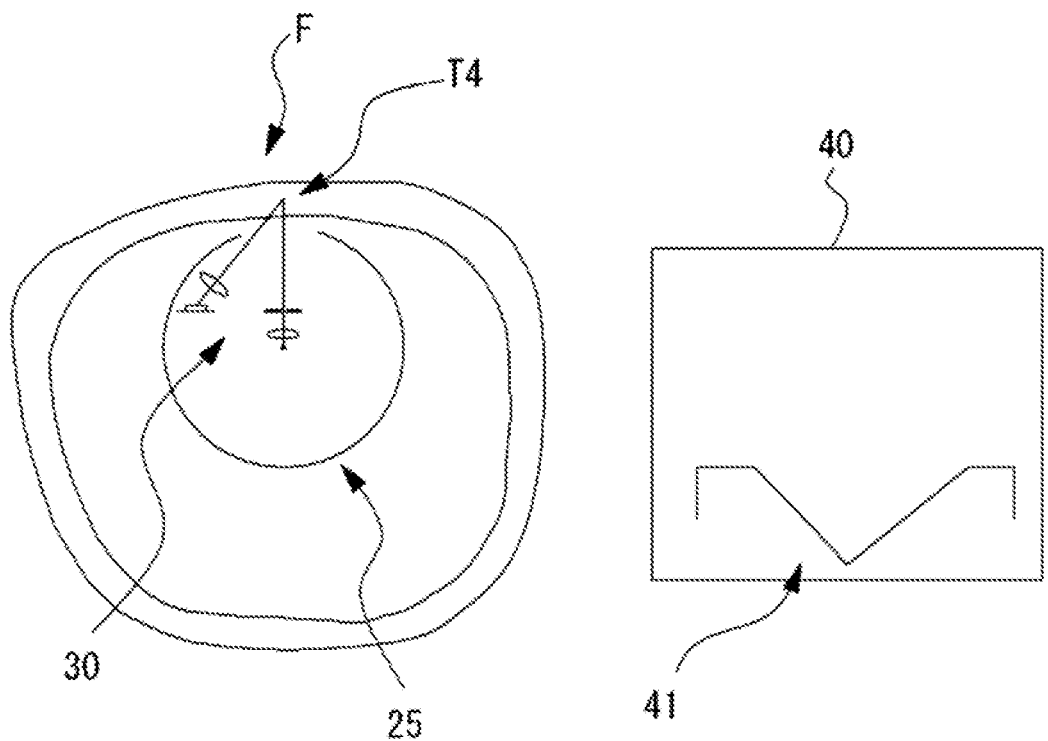
FIG. 11 is a view illustrating the light reception result after moving the holding unit such that the groove of the rim of the eyeglass frame is irradiated with the measurement light flux.

For example, FIG. 10 is a view illustrating a state where the detector 37 does receive the reflected light flux of the groove of the rim. For example, FIG. 11 is a view illustrating a state where the detector 37 receives the reflected light flux of the groove of the rim.

For example, in FIG. 10, an irradiation position T3 of the light projecting optical system 30a is not positioned at the groove of the rim. Therefore, the reflected light flux from the groove of the rim of the eyeglass frame F cannot be received. For example, in a case where the control portion 50 has acquired the cross-sectional image in a state where the reflected light flux is not received, the cross-sectional image is not displayed on an image 40 indicating the acquisition result. Meanwhile, in FIG. 11, an irradiation position T4 of the light projecting optical system 30a is positioned in the groove of the rim. In addition, the detector 37 is positioned at a position where the reflected light flux from the groove of the rim of the eyeglass frame F can be received. For example, in a case where the control portion 50 has acquired the cross-sectional image in a state where the reflected light flux was received, a cross-sectional image 41 is displayed on the image 40 indicating the acquisition result.

For example, in the present example, when the trigger signal for starting the measurement is output, the control portion 50 moves the holding unit 25 to the initial position for starting the measurement. For example, after the holding unit 25 is moved to the initial position, the control portion 50 turns on the light source 31. At this time, as illustrated in FIG. 10, in a case where the cross-sectional image 41 is not displayed, the control portion 50 controls the moving unit 210. For example, the control portion 50 analyzes the acquired image 40 and controls the moving unit 210 such that the cross-sectional image 41 is detected in a case where the cross-sectional image 41 has not been detected. Accordingly, as illustrated in FIG. 11, for example, the cross-sectional image 41 is displayed on the image 40.

Figure 12:
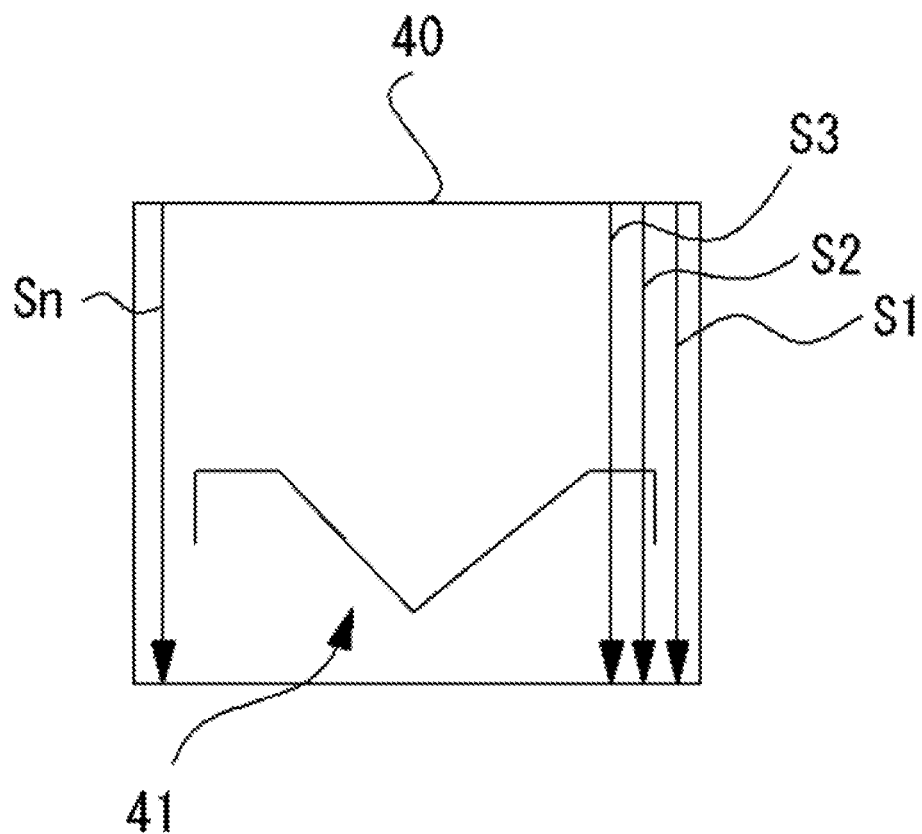
FIG. 12 is a view for describing acquisition of a luminance distribution for a cross-sectional image.

For example, the control portion 50 can detect the cross-sectional image according to the detection of the change in luminance value. For example, in a case where the cross-sectional image 41 is acquired, a certain luminance value is detected. In other words, since the reflected light flux can be detected by the detector, the luminance value increases. FIG. 12 is a view for describing detection of the luminance value. For example, the control portion 50 detects the luminance value in the order of the scanning line S1, the scanning line S2, the scanning line S3, . . . , and the scanning line Sir with respect to the acquired cross-sectional image 41, and obtains the luminance distribution. In other words, the control portion 50 can extract the cross-sectional image 41 of the rim from the image 40 by detecting the luminance value.

In addition, for example, the control portion 50 may control the moving unit 210 such that the cross-sectional image 41 of the rim is displayed at a predetermined position. In other words, for example, the control portion 50 controls the movement of the moving unit 210, such that the light receiving position of the reflected light flux of the groove of the rim on the detector 37 is changed. By changing the light receiving position, the position of the cross-sectional image 41 on the image 40 is changed.

In the following description, a case where the cross-sectional image 41 is moved in the depth direction (the up-down direction on the paper surface of FIG. 13) will be described as an example. In other words, for example, a case where the control portion 50 changes the light receiving position of the reflected light flux of the groove of the rim on the detector 37 such that the cross-sectional image 41 moves in the up-down direction of the image 40 will be described as an example. In addition, the moving direction of the cross-sectional image 41 is not limited to the above-described configuration. For example, a configuration in which the cross-sectional image 41 is moved in the left-right direction (the left-right direction on the paper surface of FIG. 13) may be employed. In other words, for example, a configuration where the control portion 50 changes the light receiving position of the reflected light flux of the groove of the rim on the detector 37 such that the cross-sectional image 41 moves in the left-right direction of the image 40 will be described as an example.

Figure 13:
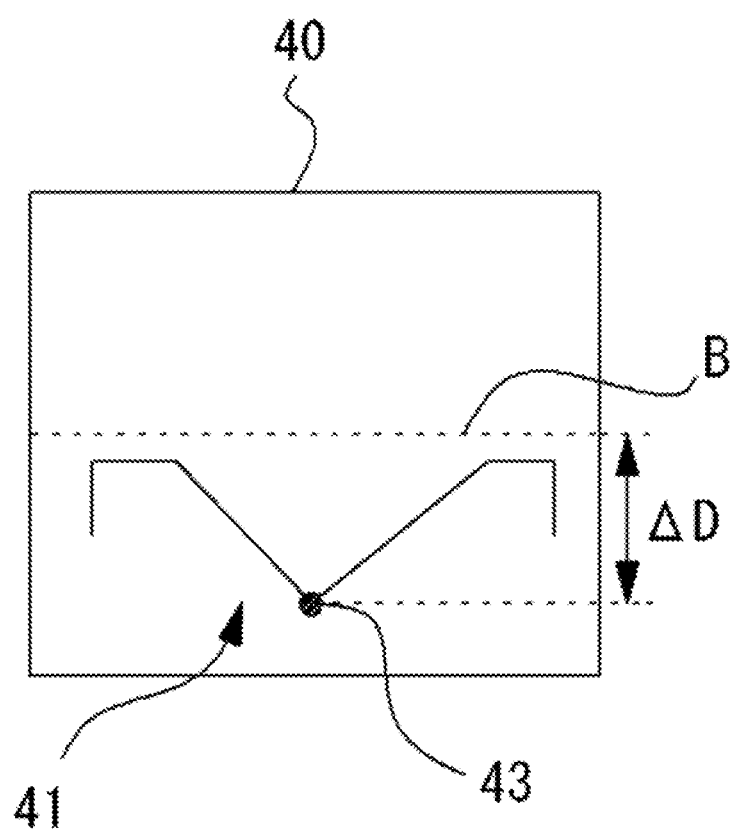
FIG. 13 is a view for describing control for moving a cross-sectional image to a predetermined position.

For example, in the present example, the control portion 50 controls the moving unit 210 such that the cross-sectional image 41 of the rim is displayed at a predetermined position. FIG. 13 is a view for describing control for moving the cross-sectional image 41 to a predetermined position. For example, in a case where the cross-sectional image 41 is displayed, the control portion 50 detects the deviation information in the depth direction (the up-down direction of the image 40) between the cross-sectional image 41 and a predetermined position B. For example, the control portion 50 controls the moving unit 210 based on the detected deviation information. For example, in a case where the detected deviation information is larger than a predetermined threshold value (predetermined allowable range), the control portion 50 may control the moving unit 210 such that the detected deviation information is equal to or less than the predetermined threshold value.

For example, in a case of controlling the moving unit 210, the control portion 50 detects the deviation information in the depth direction between the predetermined part of the rim and the predetermined position B in the cross-sectional image 41 such that a predetermined part (for example, at least one part of the rim shoulder, the slope of the groove of the rim, the bottom of the groove of the rim, and the outer portion of the rim) of the rim in the cross-sectional image 41 is displayed at the predetermined position B. In the following description, for example, a case where the control portion 50 controls the moving unit 210 such that a bottom 43 of the groove of the rim in the cross-sectional image 41 is displayed at the predetermined position B will be described as an example.

In addition, for example, the predetermined position B may be, for example, the center position (the center position of the detector 37) of the image 40 in the depth direction. It is needless to say that the predetermined position B is not limited to the center position and can be set in any manner. For example, the predetermined position B may be above or below the image region (display region) of the image 40. In addition, in the present example, the light receiving region of the detector 37 and the image region of the image 40 match each other, and the positional relationship corresponds. It is needless to say that a case where the light receiving region of the detector 37 and the image region of the image 40 are different from each other may be adopted.

In addition, for example, the predetermined threshold value may be a preset threshold value. For example, a threshold value at which the cross-sectional image is positioned to a predetermined position by a simulation or an experiment may be set in advance.

As illustrated in FIG. 13, in the present example, for example, the control portion 50 detects deviation information between the bottom 43 of the groove of the rim and the predetermined position B in the cross-sectional image 41. For example, the control portion 50 detects the position (the light receiving position of the reflected light flux on the bottom 43 of the groove of the rim in the detector 37) of the bottom 43 of the groove of the rim from the image 40. For example, the control portion 50 sets a scanning line in the depth direction on the acquired image 40 as described above, and obtains a luminance distribution on the scanning line. For example, the control portion 50 detects the bottom 43 of the groove of the rim from the luminance distribution. For example, the control portion 50 sets a plurality of scanning lines and acquires the luminance distribution in each scanning line. For example, the control portion 50 detects a position where the luminance value in the depth direction has a maximum value (hereinafter, abbreviated as the maximum luminance value) from the luminance distribution in each scanning line, and sets the position as a peak position. For example, after detecting the peak position in each scanning line, the control portion 50 detects the lowest peak position detected in the depth direction as the position of the bottom 43 of the groove of the rim. In addition, a method for detecting the bottom 43 of the groove of the rim is not limited to the above-described method. The bottom 43 of the groove of the rim may be detected by various methods.

For example, the control portion 50 detects the deviation information (for example, a deviation amount $\Delta D$ in the present example) between the detected position of the bottom 43 of the groove of the rim and the predetermined position B. In addition, in the present example, the predetermined position (reference position) B is the center position in the depth direction of the cross-sectional image, and corresponds to the center position of the display region (the image region of the image 40) on the display 3.

For example, when detecting the deviation amount $\Delta D$, the control portion 50 determines whether or not the detected deviation amount $\Delta D$ is larger than a predetermined threshold value, and controls the moving unit 210 based on the determination result. In other words, the moving unit 210 is controlled based on the deviation amount ΔD and the light receiving position of the reflected light flux from the bottom 43 of the groove of the rim in the detector 37 is changed. For example, in a case where the detected deviation amount ΔD is larger than a predetermined threshold value, the control portion 50 moves the moving unit 210 such that the deviation amount ΔD decreases.

More specifically, for example, the control portion 50 moves the cross-sectional image 41 in the depth direction by controlling at least one of the X moving unit 240 and the Y moving unit 230 in the moving unit 210. It is needless to say that the control portion 50 may further control the Z moving unit 220 in the movement in the depth direction. As an example, for example, in a case where the rim is measured at the irradiation position T4, by controlling the Y moving unit 230 and by moving the eyeglass frame measurement optical system 30 in a direction (the upward direction on the paper surface in FIG. 11) of approaching (approaching the rim) the irradiation position T4, the acquired cross-sectional image 41 is moved in the upward direction (the upward direction of the image 40 on the paper surface of FIG. 11). Meanwhile, for example, in a case where the rim is measured at the irradiation position T4, by controlling the Y moving unit 230 and by moving the eyeglass frame measurement optical system 30 in a direction (the downward direction on the paper surface in FIG. 11) of going apart (going apart from the rim) from the irradiation position T4, the acquired cross-sectional image 41 is moved in the downward direction (the downward direction of the image 40 on the paper surface of FIG. 11). In addition to the control of the Y moving unit 230, it is needless to say the X moving unit 240 may be controlled.

In addition, as an example, for example, in a case where the rim is measured at the irradiation position T2 (refer to FIG. 9B), by controlling the X moving unit 240 and by moving the eyeglass frame measurement optical system 30 in a direction (the rightward direction on the paper surface of FIG. 9B) of approaching (approaching the rim) the irradiation position T2, the acquired cross-sectional image 41 is moved in the upward direction (the upward direction of the image 40 on the paper surface of FIG. 11). Meanwhile, for example, in a case where the rim is measured at the irradiation position T2, by controlling the X moving unit 240 and by moving the eyeglass frame measurement optical system 30 in a direction (the leftward direction on the paper surface in FIG. 9B) of going apart (going apart from the rim) from the irradiation position T2, the acquired cross-sectional image 41 is moved in the downward direction (the downward direction of the image 40 on the paper surface of FIG. 11). In addition to the control of the X moving unit 240, it is needless to say that the Y moving unit 230 may be controlled.

In addition, as an example, for example, in a case of measuring the rim between the rim at the irradiation position T2 and the rim at the irradiation position T4, for example, the control of the X moving unit 240 and the Y moving unit 230 is performed, and the movement of the cross-sectional image 41 in the depth direction may be controlled. In this case, for example, by controlling the X moving unit 240 and the Y moving unit 230 and moving the eyeglass frame measurement optical system 30 in a direction of approaching the rim, the acquired cross-sectional image 41 is moved in the upward direction (the upward direction of the image 40 on the paper surface of FIG. 11). In addition, in this case, for example, by controlling the X moving unit 240 and the Y moving unit 230 and moving the eyeglass frame measurement optical system 30 in a direction of going apart the rim, the acquired cross-sectional image 41 is moved in the downward direction (the downward direction of the image 40 on the paper surface of FIG. 11).

In addition, in the present example, a case where the cross-sectional image 41 is moved in the depth direction is described as an example, but the present disclosure is not limited thereto. For example, the cross-sectional image 41 may be moved in the left-right direction (the left-right direction on the paper surface of FIG. 13) may be employed. In this case, for example, the control portion 50 moves the cross-sectional image 41 in the left-right direction by controlling the Z moving unit 220 in the moving unit 210. It is needless to say that the control portion 50 may further control at least one of the X moving unit 240 and the Y moving unit 230 in the movement in the left-right direction. As an example, for example, in a case where the rim is measured at the irradiation position T4, by controlling the Z moving unit 220 and by moving the eyeglass frame measurement optical system 30 in a direction (to the far side in the direction perpendicular to the paper surface of FIG. 11) of being lowered from the irradiation position. T4, the acquired cross-sectional image 41 is moved in the rightward direction (the rightward direction of the image 40 on the paper surface of FIG. 11). Meanwhile, for example, in a case where the rim is measured at the irradiation position T4, by controlling the Z moving unit 220 and by moving the eyeglass frame measurement optical system 30 in a direction (to the near side in the direction perpendicular to the paper surface of FIG. 11) of being raised from the irradiation position T4, the acquired cross-sectional image 41 is moved in the leftward direction (the leftward direction of the image 40 on the paper surface of FIG. 11).

With the above-described control, the display position of the cross-sectional image 41 on the image 40 is changed. In addition, in a case where the detected deviation amount ΔD is equal to or less than the predetermined threshold value, the control portion 50 does not move the moving unit 210. As described above, the cross-sectional image of the bottom of the groove of the rim at the predetermined position can be displayed. For example, after the control for changing the light receiving position in the detector 37 is completed, the control portion 50 acquires the cross-sectional image of the groove of the rim.

As described above, in the present example, the eyeglass frame shape measurement device includes: the change means for changing the light receiving position of the reflected light flux; and the control means for controlling the change means to change the light receiving position of the reflected light flux such that the detector receives the reflected light flux of the groove of the rim. Accordingly, for example, since the reflected light flux is received by the detector, even in a case where various shapes of the eyeglass frames have been measured, it is possible to excellently acquire the cross-sectional shape of the groove of the rim in various shapes of the eyeglass frame. In other words, the eyeglass frame shape measurement device according to the present disclosure can correspond to various shapes of eyeglass frames in acquiring the cross-sectional shape of the groove of the rim in the eyeglass frame.

Further, for example, the control means may control the change means to change the light receiving position of the reflected light flux based on the reflected light flux received by the detector. Accordingly, for example, since the light receiving position of the reflected light flub based on the received reflected light flux can be changed, the change can be performed such that the reflected light flux of the rim is received with higher accuracy. Thereby, an excellent cross-sectional shape can be easily acquired.

In addition, for example, the eyeglass frame shape measurement device may include the position acquisition means for acquiring the light receiving position of the reflected light flux. Further, for example, the control means may control the change means to change the light receiving position of the reflected light flux based on the light receiving position of the reflected light flux acquired by the position acquisition means. Accordingly, for example, since the light receiving position of the reflected light flux based on the light receiving position can be changed, an excellent cross-sectional shape can be acquired more easily and accurately.

In addition, for example, the position acquisition means may acquire the light receiving position of the reflected light flux at least at one part of the rim. Further, for example, the control means may control the change means to change the light receiving position of the reflected light flux of the groove of the rim based on the light receiving position at least at one part of the rim acquired by the position acquisition means. Accordingly, for example, since the light receiving position can be changed based on the reflected light flux at a specific part of the rim, the change can be performed such that the reflected light flux of the rim is received with higher accuracy. Thereby, an excellent cross-sectional shape can be more easily acquired.

In addition, for example, the acquisition means may acquire the cross-sectional image of the groove of the rim of the eyeglass frame as the cross-sectional shape based on the reflected light flux received by the detector. Further, for example, the position acquisition means may acquire the light receiving position of the reflected light flux by analyzing the cross-sectional image to acquire a position of the cross-sectional image. In addition, for example, the control means may control the change means to change the light receiving position of the reflected light flux of the groove of the rim based on the position of the cross-sectional image acquired by the position acquisition means. Accordingly, for example, since the light receiving position of the reflected light flux can be changed by using the cross-sectional image, the light receiving position of the reflected light flux can be more easily specified. Thereby, an excellent cross-sectional shape can be more easily acquired.

Further, for example, the control means may control the change means to change the light receiving position of the reflected light flux such that the reflected light flux of the groove of the rim is received at the predetermined position of the detector. Accordingly, for example, since the reflected light flux is received at a predetermined position of the detector, the reflected light flux can be positioned at any position, and thus, it is possible to make it easy to acquire the cross-sectional shape more excellently.

Further, for example, the control means may acquire the deviation information between the predetermined position and the light receiving position, and may control the change means to change the light receiving position of the reflected light flux of the groove of the rim based on the deviation information. Accordingly, since the light receiving position can be changed based on the deviation information, the reflected light flux of the rim can be easily and accurately received at a predetermined position.

For example, as described above, when the cross-sectional image at the initial position is acquired, the control portion 50 changes the position where the cross-sectional image of the groove of the rim is acquired, and sequentially acquires the cross-sectional image of the groove of the rim at each vector angle. For example, the control portion 50 controls the rotation unit 260 to change the position where the cross-sectional image of the groove of the rim is acquired while changing the vector angle with the rotation shaft (in the present example, the shaft passing through the light source 31) LO as a center. Accordingly, the position where the cross-sectional image of the rim is acquired is moved in the peripheral direction of the rim.

For example, every time the position where the cross-sectional image of the rim is acquired is changed, the control portion 50 controls the moving unit 210 such that the detector 37 receives the reflected light flux of the groove of the rim excellently. For example, every time the position where the cross-sectional image of the rim is acquired is changed in the peripheral direction of the rim, the control portion 50 controls the moving unit 210 and displays the bottom 43 of the groove of the rim in the cross-sectional image 41 at the predetermined position B.

In addition, the control for excellently receiving the reflected light flux of the groove of the rim by the detector 37 may be executed at predetermined intervals. For example, the control portion 50 may be configured to perform the measurement of the groove of the rim at least at one measurement position (in the present example, the acquisition position of the cross-sectional image) while changing the light receiving position such that the detector receives the reflected light flux of the groove of the rim excellently. For example, in the present example, a case where the control for excellently receiving the reflected light flux of the groove of the rim by the detector 37 is executed at each acquisition position of the cross-sectional image has been described as an example.

For example, the control portion 50 acquires the cross-sectional image of the groove of the rim and stores each of the acquired cross-sectional images in the memory 52 after controlling the moving unit 210 such that the detector 37 receives the reflected light flux of the groove of the rim excellently, at each acquisition position (each measurement position) of the cross-sectional image. Further, the acquisition position of each cross-sectional image is calculated from at least one of the number of pulses of the motor 225, the number of pulses of the motor 235, the number of pulses of the motor 245, and the detection result of the encoder 265a, and is stored in the memory 52. In other words, by acquiring at least one of the number of pulses of the motor 225, the number of pulses of the motor 235, the number of pulses of the motor 245, and the detection result of the encoder 265a, the position where the cross-sectional image of the rim is acquired can be specified. In this manner, for example, the control portion 50 can acquire the position (acquisition position information) at which the cross-sectional image of the groove of the rim is acquired. For example, the acquisition position information can be used when acquiring the three-dimensional cross-sectional image of the groove of the rim, the shape of the eyeglass frame, and the like.

In this manner, for example, the acquisition means may acquire the cross-sectional shape of the groove of the rim at each of a plurality of vector angles of the eyeglass frame, and acquire the three-dimensional cross-sectional shape of the groove of the rim by aligning the cross-sectional shapes based on change information of the change means controlled by the control means when the cross-sectional shapes of the groove of the rim at the plurality of vector angles are acquired. Accordingly, for example, since it is possible to confirm the measurement conditions when the cross-sectional shape is acquired from the change information, the alignment between the cross-sectional shapes of the rim at a plurality of vector angles can be easily performed. Thereby, an excellent three-dimensional shape can be acquired.

Figure 14:
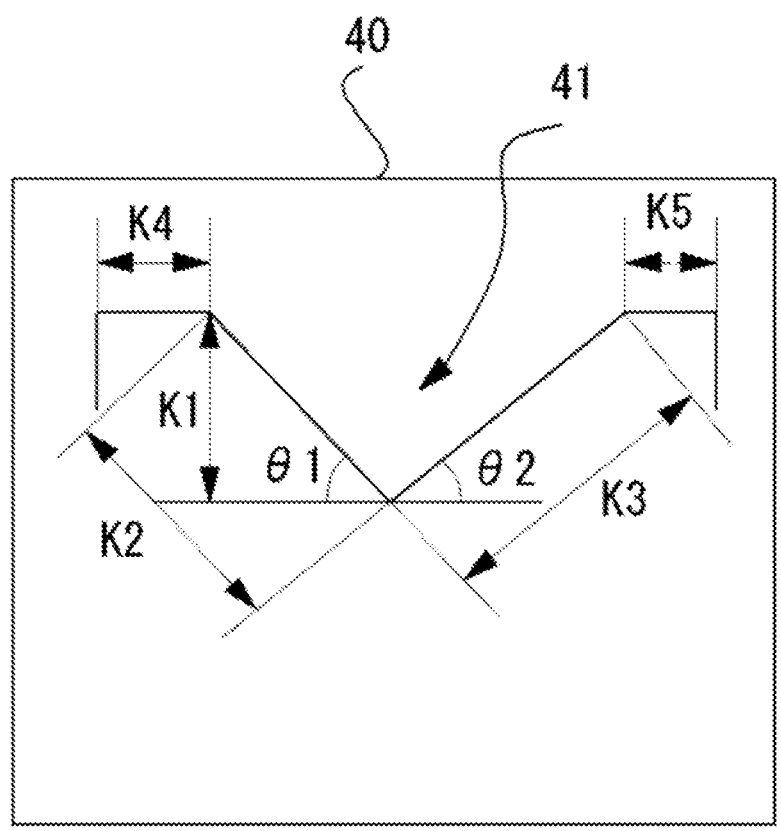
FIG. 14 is a view for describing parameters acquired from the cross-sectional image of the groove of the rim.

For example, the control portion 50 can acquire various parameters related to the groove of the rim by performing analysis processing with respect to the acquired cross-sectional image. FIG. 14 is a view for describing parameters acquired from the cross-sectional image of the groove of the rim. For example, the control portion 50 can acquire the parameters of the groove of the rim by acquiring the luminance distribution of the cross-sectional image by image processing. For example, as the parameters of the groove of the rim, the control portion 50 can obtain a distance K1 to the bottom of the groove of the rim, left and right slope angles θ1 and θ2 of the groove of the rim, left and right slope lengths K2 and K3 of the groove of the rim, lengths K4 and K5 of the left and right rim shoulders, and the like.

For example, the control portion 50 can acquire the cross-sectional image of the groove of the rim in the entire periphery of the rim by repeating the above-described control over the entire periphery of the rim. For example, when the acquisition of the cross-sectional image of the groove of the rim in the entire periphery of the rim is completed, the control portion 50 calls the cross-sectional image of the entire periphery of the rim and the acquisition position information stored in the memory 52, performs arithmetic processing, and acquires the three-dimensional cross-sectional image. For example, the control portion 50 stores the acquired three-dimensional cross-sectional image in the memory 52. In the present example, the configuration in which the three-dimensional cross-sectional image is acquired after the acquisition of the cross-sectional image in the entire periphery of the rim is completed has been described as an example, but the present disclosure is not limited thereto. For each acquisition position of the cross-sectional image of the groove of the rim, the arithmetic processing may be performed every time the cross-sectional image is acquired.

For example, the control portion 50 can acquire the shape (shape data) of the eyeglass frame from the acquired cross-sectional image. For example, the control portion 50 detects the bottom of the groove of the rim at each of the plurality of vector angles of the eyeglass frame from the cross-sectional image of the groove of the rim at the plurality of vector angles of the eyeglass frame, and acquires the shape of the eyeglass frame based on the detected detection result.

For example, as described above, the control portion 50 can detect the position of the bottom of the groove of the rim by acquiring the luminance distribution of the cross-sectional image by the image processing. As illustrated in FIG. 12, for example, the control portion 50 detects the luminance value in the order of the scanning line S1, the scanning line S2, the scanning line S3, . . . , and the scanning line Sn with respect to the acquired cross-sectional image, and obtains the luminance distribution. For example, the control portion 50 may detect the position where the luminance value is detected at the lowest position in the obtained luminance distribution as the bottom of the groove of the rim.

For example, the control portion 50 processes each of the cross-sectional images acquired for each vector angle, and detects each position of the bottom of the groove of the rim on the image. For example, the control portion 50 acquires the position information of the bottom of the groove of the rim from the position of the bottom of the groove of the rim on the image detected from the cross-sectional image and the acquisition position information acquired from the cross-sectional image. For example, the control portion 50 detects the position of the bottom of the groove of the rim on the image from the cross-sectional images acquired for each vector angle, and acquires each piece of position information of the bottom of the groove of the rim for each vector angle from the position of the bottom of the groove of the rim on the detected image and the acquisition position information obtained by acquiring the cross-sectional image. Accordingly, for example, the control portion 50 acquires the three-dimensional shape (rn, zn, θn) (n=1, 2, 3, . . . , N) of the eyeglass frame F. For example, the three-dimensional shape of the eyeglass frame Fn may be acquired over the entire periphery of the rim, or may be acquired in a partial region of the entire periphery of the rim. As described above, the shape of the eyeglass frame F can be acquired.

In the present example, a configuration in which the three-dimensional shape of the eyeglass frame is acquired by acquiring the position information of the bottom of the groove of the rim for each vector angle has been described as an example, but the present disclosure is not limited thereto. For example, when acquiring the three-dimensional shape of the eyeglass frame, at each vector angle, with respect to the position where the position information of the bottom of the groove of the rim is not acquired, the position information of the bottom of the groove of the rim may be acquired by interpolation based on the position information of the bottom of the groove of the rim at a vector angle of the periphery. For example, when acquiring the three-dimensional shape of the eyeglass frame, at each vector angle, with respect to the position where the position information of the bottom of the groove of the rim is not acquired, the result of approximation of the position information of the bottom of the groove of the rim at the vector angle of the periphery may be interpolated.

For example, when the measurement of the right rim FR is completed, the control portion 50 controls the driving of the X moving unit 240 and moves the holding unit 25 to a predetermined position for the measurement of the left rim FL. Similar to the above-described measurement control, the acquisition of the cross-sectional shape of the right rim FR and the shape of the eyeglass frame are acquired. The cross-sectional images and shapes of the right rim FR and the left rim FL are stored in the memory 52.

For example, various parameters may be acquired based on the acquired three-dimensional shape of the eyeglass frame. For example, a two-dimensional shape may be acquired from the three-dimensional shape of the eyeglass frame. For example, the two-dimensional shape can be acquired by making a shape obtained by projecting the three-dimensional shape onto the XY plane in the front direction of the eyeglass frame F. As the two-dimensional shape, a configuration for acquiring the three-dimensional shape has been described as an example, but the present disclosure is not limited thereto. When acquiring the position information of the bottom of the groove of the rim based on the cross-sectional image of the rim at each vector angle, the position information may be acquired by detecting only the position information of the bottom of the groove of the rim on the XY plane.

As described above, the cross-sectional shape of the groove of the rim, the shape of the eyeglass frame, and the like which are acquired by the eyeglass frame shape measurement device 1 are transmitted to the lens processing device 300 by the control portion 50. For example, the control portion 310 of the lens processing device 300 receives the cross-sectional shape of the groove of the rim, the shape of the eyeglass frame, and the like which are acquired by the eyeglass frame shape measurement device 1.

For example, the lens processing device 300 includes lens rotating means for rotating while holding the lens on a lens chuck shaft, and processing tool rotating means for rotating the processing tool attached to a processing tool rotation shaft. For example, in the lens processing device 300, the control portion 310 of the lens processing device controls the lens rotating means and the processing tool rotating means based on the acquired information (for example, the cross-sectional shape of the groove of the rim of the eyeglass frame, the shape of the eyeglass frame, and the like) acquired by the eyeglass frame shape measurement device 1, and processes the peripheral edge of the lens. The control portion 310 of the lens processing device may be configured such that the control portion of the eyeglass frame shape measurement device 1 is also used, or the control portion 310 for performing various controls of the lens processing device may be provided separately.

For example, in the present example, the eyeglass frame shape measurement device includes: the light projecting optical system that emits the measurement light flux from the light source toward the rim of the eyeglass frame; the light receiving optical system that causes the detector to receive the reflected light flux of the measurement light flux emitted toward the rim of the eyeglass frame by the light projecting optical system and reflected by the rim of the eyeglass frame; and the acquisition means for acquiring the cross-sectional shape of the rim of the eyeglass frame based on the reflected light flux received by the detector. Accordingly, for example, the cross-sectional shape of the rim of the eyeglass frame can be acquired easily and accurately. In addition, for example, since measurement is performed using the measurement light flux, the measurement can be performed quickly.

Further, for example, in the present example, the eyeglass frame shape measurement device includes the first change means for changing the irradiation position of the measurement light flux on the groove of the rim of the eyeglass frame, and the first control means for controlling the first change means. Accordingly, it becomes possible to irradiate any position of the groove of the rim in the eyeglass frame with the measurement light flux, and to acquire the cross-sectional shape of the groove of the rim at any position.

For example, in the present example, in the eyeglass frame shape measurement device, the first change means is the change means for moving the position of at least the part of the light projecting optical system, and the first control means controls the first change means to change the position of at least the part of the light projecting optical system with respect to the groove of the rim of the eyeglass frame and change the irradiation position of the measurement light flux with respect to the groove of the rim of the eyeglass frame. Accordingly, it becomes possible to irradiate any position of the groove of the rim in the eyeglass frame with the measurement light flux, and to acquire the cross-sectional shape of the groove of the rim at any position.

Further, for example, in the present example, the eyeglass frame shape measurement device includes the second change means for changing the light receiving position of reflected light flux by the light receiving optical system, and second control means for controlling the second change means. Accordingly, the light receiving position can be changed to a position where the cross-sectional shape of the groove of the rim can be acquired excellently, and the cross-sectional shape of the rim of the eyeglass frame can be acquired more accurately.

Further, for example, in the present example, in the eyeglass frame shape measurement device, the first control means controls the first change means and to irradiate the groove of the rim at the plurality of vector angles of the eyeglass frame with the measurement light flux. The acquisition means may acquire the cross-sectional shape of the groove of the rim at each of the plurality of vector angles of the eyeglass frame. The eyeglass frame shape measurement device includes the analysis means for detecting the bottom of the groove of the rim at each of the plurality of vector angles of the eyeglass frame from the cross-sectional shape of the groove of the rim at the plurality of vector angles of the eyeglass frame, and acquiring the shape of the eyeglass frame based on the detected detection result. Accordingly, unlike the related art, depending on the eyeglass frame, it is possible to suppress a case where the measurement cannot be performed due to detachment of a probe from the groove of the lens frame, and the shape of the eyeglass frame can be acquired easily and accurately with respect to the various shapes of the eyeglass frame.

Further, for example, in the present example, in the eyeglass frame shape measurement device, the first control means controls the first change means to irradiate the groove of the rim at the plurality of vector angles of the eyeglass frame with the measurement light flux. The acquisition means acquires the cross-sectional shape of the groove of the rim at each of the plurality of vector angles of the eyeglass frame, and acquires the three-dimensional cross-sectional shape. Accordingly, the three-dimensional cross-sectional shape of the eyeglass frame can be acquired easily and accurately.

Further, for example, in the present example, the lens processing device includes processing control means for processing the peripheral edge of the lens based on the cross-sectional shape of the groove of the rim of the eyeglass frame. Accordingly, when the processed lens is excellently framed into the eyeglass frame, the shape of the groove of the rim and the contour shape of the processed lens are close to each other, and thus, the framing can be excellently performed.

In the present example, at least one of the cross-sectional shape and the shape of the eyeglass frame may be displayed on the display 3. It is needless to say that the display may be performed on a display (not illustrated) of the lens processing device 300. For example, the cross-sectional shape and the shape of the eyeglass frame may be displayed on the display 3 by different screens. In this case, the cross-sectional shape and the shape of the eyeglass frame may be switched and displayed by switching the screen. For example, the cross-sectional shape and the shape of the eyeglass frame may be displayed on the same screen. In this case, for example, the cross-sectional shape and the shape of the eyeglass frame may be arranged side by side on the same screen. At this time, for example, in the shape of the eyeglass frame, a display indicating the acquisition position of the cross-sectional shape may be displayed such that the acquisition position of the cross-sectional shape can be identified. In this case, for example, the cross-sectional shape and the shape of the eyeglass frame may be superimposed and displayed. In a case where the superimposed display is performed, the cross-sectional shape and the shape of the eyeglass frame may be aligned based on the acquisition position information of the cross-sectional shape and the acquisition position of the cross-sectional shape of the groove of the rim.

REFERENCE SIGNS LIST 1 eyeglass frame shape measurement device
3 display
4 switch portion
10 frame holding unit
20 measurement unit
25 holding unit
30 eyeglass frame measurement optical system
30a light projecting optical system
30b light receiving optical system
31 light source
37 detector
50 control portion
52 memory
210 moving unit
220 Z moving unit
230 Y moving unit
240 X moving unit
260 rotation unit
300 lens processing device
310 control portion

The invention claimed is:

1. An eyeglass frame shape measurement device that measures a shape of an eyeglass frame, comprising:
a light projecting optical system having a light source and configured to emit a measurement light flux from the light source toward a groove of a rim of an eyeglass frame;
a light receiving optical system having a detector and configured to cause the detector to receive a reflected light flux of the measurement light flux emitted toward the groove of the rim of the eyeglass frame by the light projecting optical system and reflected by the groove of the rim of the eyeglass frame;
a controller, comprising a processor, a memory and programming having an acquisition section and a control section; and
a change section comprising a translational motor drive for translational movement and a rotation motor drive for rotational movement;
wherein:
the acquisition section is configured to acquire a cross-sectional shape of the groove of the rim of the eyeglass frame based on the reflected light flux received by the detector;
the change section is configured to change a light receiving position of the reflected light flux; and
the control section is configured to control the change section to change the light receiving position of the reflected light flux such that the detector receives the reflected light flux of the groove of the rim.

2. The eyeglass frame shape measurement device according to claim 1,
wherein the control section controls the change section to change the light receiving position of the reflected light flux based on the reflected light flux received by the detector.

3. The eyeglass frame shape measurement device according to claim 2, further comprising:
a position acquisition section configured to acquire the light receiving position of the reflected light flux,
wherein the control section controls the change section to change the light receiving position of the reflected light flux based on the light receiving position of the reflected light flux acquired by the position acquisition section.

4. The eyeglass frame shape measurement device according to claim 3,
wherein the position acquisition section acquires the light receiving position of the reflected light flux of at least one part of the rim, and
the control section controls the change section to change the light receiving position of the reflected light flux of the groove of the rim based on the light receiving position of at least one part of the rim acquired by the position acquisition section.

5. The eyeglass frame shape measurement device according to claim 3,
wherein the acquisition section acquires a cross-sectional image of the groove of the rim of the eyeglass frame as the cross-sectional shape based on the reflected light flux received by the detector,
the position acquisition section acquires the light receiving position of the reflected light flux by analyzing the cross-sectional image to acquire a position of the cross-sectional image, and
the control section controls the change section to change the light receiving position of the reflected light flux of the groove of the rim based on the position of the cross-sectional image acquired by the position acquisition section.

6. The eyeglass frame shape measurement device according to claim 2,
wherein the control section controls the change section to change the light receiving position of the reflected light flux such that the reflected light flux of the groove of the rim is received at a predetermined position of the detector.

7. The eyeglass frame shape measurement device according to claim 6,
wherein the control section acquires deviation information between the predetermined position and the light receiving position, and controls the change section to change the light receiving position of the reflected light flux of the groove of the rim based on the deviation information.

8. The eyeglass frame shape measurement device according to claim 1,
wherein the change section includes a first change section configured to change an irradiation position of the measurement light flux with respect to the groove of the rim of the eyeglass frame.

9. The eyeglass frame shape measurement device according to claim 1,
wherein the change section includes a second change section configured to change a light receiving position of the reflected light flux by the light receiving optical system.

10. The eyeglass frame shape measurement device according to claim 1,
wherein the acquisition section acquires the cross-sectional shape of the groove of the rim at each of a plurality of vector angles of the eyeglass frame, and acquires a three-dimensional cross-sectional shape of the groove of the rim by aligning the cross-sectional shapes based on change information of the change section controlled by the control section when the cross-sectional shapes of the groove of the rim at the plurality of vector angles are acquired.

11. The eyeglass frame shape measurement device according to claim 1,
wherein after the measurement of the eyeglass frame is started, the control section controls the change section to change the light receiving position of the reflected light flux such that the detector receives the reflected light flux of the groove of the rim.

12. The eyeglass frame shape measurement device according to claim 11,
wherein during the measurement of the eyeglass frame, the control section controls the change section to change the light receiving position of the reflected light flux in real time such that the detector receives the reflected light flux of the groove of the rim.

13. A non-transitory computer readable recording medium storing an eyeglass frame shape measurement program executed in an eyeglass frame shape measurement device that measures a shape of an eyeglass frame, and includes:
a light projecting optical system having a light source and configured to emit a measurement light flux from the light source toward a groove of a rim of an eyeglass frame;
a light receiving optical system having a detector and configured to cause the detector to receive a reflected light flux of the measurement light flux emitted toward the groove of the rim of the eyeglass frame by the light projecting optical system and reflected by the groove of the rim of the eyeglass frame;
a controller, comprising a processor, a memory, and the measurement programming having an acquisition section, a control section; and
a change section comprising a translational motor drive for translational movement and a rotation motor drive for rotational movement;
wherein:
the acquisition section is configured to acquire a cross-sectional shape of the groove of the rim of the eyeglass frame based on the reflected light flux received by the detector,
the eyeglass frame shape measurement program being executed by the processor of the eyeglass frame shape measurement device to cause the eyeglass frame shape measurement device to perform:
a control step of controlling the change section configured to change a light receiving position of the reflected light flux to change the light receiving position of the reflected light flux of the groove of the rim such that the detector receives the reflected light flux of the rim.

* * * * *